US011289214B2

(12) United States Patent
Marquino et al.

(10) Patent No.: US 11,289,214 B2
(45) Date of Patent: Mar. 29, 2022

(54) PASSIVE CONTAINMENT COOLING SYSTEM INCLUDING MULTIPLE CONDENSING STAGES AND CATALYST

(71) Applicant: GE-Hitachi Nuclear Energy Americas LLC, Wilmington, NC (US)

(72) Inventors: Wayne Marquino, Wilmington, NC (US); Jun Yang, Cary, NC (US); Md Almagir, Morgan Hill, CA (US); David L. Major, Wilmington, NC (US)

(73) Assignee: GE-Hitachi Nuclear Energy Americas LLC, Wilmington, NC (US)

(*) Notice: Subject to any disclaimer, the term of this patent is extended or adjusted under 35 U.S.C. 154(b) by 680 days.

(21) Appl. No.: 16/288,494

(22) Filed: Feb. 28, 2019

(65) Prior Publication Data

US 2020/0279662 A1 Sep. 3, 2020

(51) Int. Cl.
*G21C 9/012* (2006.01)
*F28B 1/00* (2006.01)
(Continued)

(52) U.S. Cl.
CPC ................ *G21C 9/012* (2013.01); *F28B 1/00* (2013.01); *F28B 7/00* (2013.01); *F28B 9/10* (2013.01);
(Continued)

(58) Field of Classification Search
CPC .......... G21C 9/012; G21C 9/06; G21C 15/22; G21C 15/12; G21C 15/18; G21C 15/187;
(Continued)

(56) References Cited

U.S. PATENT DOCUMENTS 4,911,879 A 3/1990 Heck et al.
8,917,810 B2 12/2014 Marquino et al.

FOREIGN PATENT DOCUMENTS

DE 3816012 A1 11/1989
EP 0303144 A1 2/1989
(Continued)

OTHER PUBLICATIONS

Written Opinion and International Search Report dated May 7, 2020, issued in corresponding International Application No. PCT/US2020/018767.

(Continued)

*Primary Examiner* — Jack W Keith
*Assistant Examiner* — Daniel Wasil
(74) *Attorney, Agent, or Firm* — Harness, Dickey & Pierce, P.L.C.

(57) ABSTRACT

A passive containment cooling system (PCCS) condenser, for reducing some non-condensable gases in the PCCS, includes a first and a second stage condenser that each include channels in fluid communication between an inlet and an outlet header. The inlet header of the first stage condenser is configured to receive a fluid mixture through a first inlet opening. The channels are configured to condense water from the fluid mixture flowing through the channels from the inlet header to the outlet header, respectively, of the first and second stage condenser. The PCCS condenser includes a catalyst in at least one of the outlet header of the first stage condenser or the inlet header of the second stage condenser. The catalyst catalyzes a reaction for forming water from hydrogen and oxygen in the fluid mixture. The outlet header of the second stage condenser is in fluid communication with a combined vent-and-drain line.

15 Claims, 8 Drawing Sheets

(51) Int. Cl.

| | |
|---|---|
| ***F28B 7/00*** | (2006.01) |
| ***F28B 9/10*** | (2006.01) |
| ***G21C 9/06*** | (2006.01) |
| ***G21C 15/22*** | (2006.01) |
| ***G21C 15/12*** | (2006.01) |
| ***G21C 15/18*** | (2006.01) |
| ***F28D 1/053*** | (2006.01) |
| *F22B 35/00* | (2006.01) |
| *F28B 9/00* | (2006.01) |
| *F28B 11/00* | (2006.01) |
| *F28D 21/00* | (2006.01) |
| *F28F 9/02* | (2006.01) |

(52) U.S. Cl.

CPC ........... *F28D 1/05308* (2013.01); *G21C 9/06* (2013.01); *G21C 15/12* (2013.01); *G21C 15/18* (2013.01); *G21C 15/22* (2013.01); *F22B 35/004* (2013.01); *F28B 9/00* (2013.01); *F28B 11/00* (2013.01); *F28D 2021/0054* (2013.01); *F28D 2021/0063* (2013.01); *F28F 9/0234* (2013.01); *G21C 15/187* (2019.01)

(58) Field of Classification Search

CPC ...... F28B 1/00; F28B 7/00; F28B 9/10; F28B 9/00; F28B 11/00; F28B 35/004; F28D 1/05308; F28D 2021/0054; F28D 2021/0063; F28F 9/0234

USPC .................................................. 376/299, 301

See application file for complete search history.

(56) References Cited

FOREIGN PATENT DOCUMENTS

| | | | |
|---|---|---|---|
| EP | 0303144 | B1 | 6/1992 |
| EP | 0801281 | A2 | 10/1997 |
| JP | H10221477 | A | 8/1998 |
| JP | 2002509262 | A | 3/2002 |
| JP | 2013/170883 | A | 9/2013 |

OTHER PUBLICATIONS

Reactor Pressure Vessel (RPV) Level Response for the Long Term PCCS Period Phenomena Identification and Ranking Table Major Design Changes from Pre-Application Review Design to DCD Design. MFN 05-105, FIG. 1 <http://www.nrc.gov/docs/ML0531/ML053140223.pdf> (available around Mar. 1, 2017 according to <https://web.archive.org>.

B.S. Chiralkar and Y.K. Cheung, TRACG Application for ESBWR, NEDO-33083-A, p. 136, Oct. 2005.

J.R. Fitch et al.. 'Tests of Passive Containment Condensers—TRACG qualification for SBWR, NEDO-32725,' Aug. 2002 (with redactions).

GE Hitachi Nuclear Energy, 'ESBWR ICS and PCCS Condenser Combustible Gas Mitigation and Structural Evaluation,' NEDO-33572, Revision 3, Class I.

D. Papini et al., 'Assessment of GOTHIC and TRACE codes against selected PANDA experiments on a Passive Containment Condenser' *Nuclear Engineering and Design*, vol. 278, Oct. 2014, pp. 542-557.

International Preliminary Report on Patentability dated Aug. 25, 2021, issued in corresponding International Patent Application No. PCT/US2020/018767.

100b

PASSIVE CONTAINMENT COOLING SYSTEM INCLUDING MULTIPLE CONDENSING STAGES AND CATALYST

BACKGROUND

Field

The present disclosure relates to a passive containment cooling system using multiple condensing stages and inter-stage catalyst and/or a method of making the same.

Description of Related Art

After a nuclear reactor shuts down, byproducts of the nuclear reaction continue to undergo radioactive decay and generate heat. Decay heat from the byproducts of the nuclear reaction is removed in order to limit and/or prevent damage to the nuclear fuel. If the nuclear reactor has a containment system, the decay heat may be removed from the containment system to limit and/or avoid over-pressurization and damage to the containment system. Nuclear plants with passive-safety features may remove this decay heat by natural convection, conduction and/or radiant heat transfer unassisted by forced flow or electric power.

Some reactor designs include a Passive Containment Cooling System (PCCS) to remove the reactor's decay heat from the containment system. The PCCS system may include PCCS condensers, which condense the steam generated while cooling the reactor core in a heat exchanger. PCCS condensers may include channels (e.g., tubes and/or parallel plates) and may transfer heat to a pool outside of containment and release it to the atmosphere as water vapor, or directly transfer it to the air.

In an accident scenario, the nuclear reactor may be depressurized to the containment system. For a nuclear plant with a PCCS, depressurizing the nuclear reactor to the containment system may force steam, nitrogen and other non-condensable gases through the condenser tubes of the PCCS condensers, and through a vent path to a suppression pool (in the wet well compartment). After reactor depressurization, the flow to the PCCS condenser may be mostly steam and may include trace amounts of non-condensable gases (e.g., hydrogen, oxygen and nitrogen). Hydrogen and oxygen may be present in the PCCS condenser due to the radiolysis of water.

The amount of some non-condensable gases (e.g., $H_2$ and $O_2$) in the PCCS may be reduced. For example, U.S. Pat. No. 8,917,810 B2, entitled "DEVICES AND METHODS FOR MANAGING NONCOMBUSTABLE GASES IN NUCLEAR POWER PLANTS", describes a system and/or method for passively reducing non-condensable gases by placing some catalyst systems in various parts of the PCCS condenser (e.g., lower header of the PCCS condensers). The catalyst systems may be used for recombining hydrogen and oxygen. The entire contents of U.S. Pat. No. 8,917,810 are incorporated by reference herein.

SUMMARY

Some example embodiments relate to a PCCS system for a nuclear reactor.

Other example embodiments relate to a PCCS condenser.

Yet, other example embodiments relate a method of making a PCCS condenser.

According to some example embodiments, a passive containment cooling system (PCCS) for a nuclear reactor is provided. The PCCS may include a first stage condenser and a second stage condenser. The first stage condenser may include a first inlet header, a first outlet header defining a first outlet opening, and first channels in fluid communication between the first inlet header and the first outlet header. The first inlet header may define a first inlet opening for receiving a fluid mixture. The first channels may be configured to condense a first condensate portion from a first gas in the fluid mixture, based on heat exchange between the fluid mixture and a cooling pool through the first channels, as the fluid mixture flows through the first channels from the first inlet header to the first outlet header. The PCCS may include a catalyst in at least one of the first outlet header or a second inlet header of a second stage condenser. The catalyst may be configured to catalyze a reaction for forming the first gas from a second gas and a third gas in the fluid mixture as the fluid mixture flows through the at least one of the first outlet header or the second inlet header. The second stage condenser may include the second inlet header, a second outlet header, and second channels in fluid communication between the second inlet header and the second outlet header. The second inlet header may define a second inlet opening in fluid communication with the first outlet opening for receiving the fluid mixture from the first outlet header. The second channels may be configured to condense a second condensate portion from the first gas, based on heat exchange between the fluid mixture and the external environment through the second channels, as the fluid mixture flows through the second channels from the second inlet header to the second outlet header. The second outlet header may define a second outlet opening for providing the second condensate portion to a drain line. The second outlet header may define a vent opening for transmitting a portion of the fluid mixture to a vent line.

In some example embodiments, the catalyst may include at least one of palladium (Pd), platinum (Pt), rhodium (Rh), alloys thereof, or a combination thereof, and the first stage condenser and the second stage condenser may be formed of stainless steel.

In some example embodiments, a heat-transfer area corresponding to the first channels may be greater than a heat-transfer area corresponding to the second channels, and/or an overall size of the first stage condenser may be greater than an overall size of the second stage condenser. The second stage size can be based on the reduced amount of the first gas present after the catalytic reaction.

In some example embodiments, the PCCS condenser may further include at least one of an inlet conduit connected to the first inlet opening, the drain line connected to the second outlet opening, and the vent line connected to the vent opening of the second outlet header.

In some example embodiments, the PCCS condenser may further include a cross-over conduit structure connected to the first outlet opening of the first outlet header and the second inlet opening of the second inlet header. The cross-over conduit structure may be configured to provide a flow path for the fluid mixture between the first outlet header and the second inlet header.

In some example embodiments, the first stage condenser and the second stage condenser may be spaced apart from each other.

In some example embodiments, the cross-over conduit structure may include a pipe and an insulation material surrounding the pipe.

In some example embodiments, a part of the cross-over conduit structure may extend into the first outlet header, and the part of the cross-over conduit structure may include a loop seal at a terminal portion for returning any condensate in the cross-over conduit to the first stage drain system.

In some example embodiments, the first outlet header may define a drain opening for providing at least part of the first condensate portion to the drain line, and the drain opening of the first outlet header may be spaced apart from the first outlet opening of the first outlet header.

In some example embodiments, the first stage condenser and the second stage condenser may be connected to each other. The first inlet header and the second inlet header may be connected to each other side-by-side. The first outlet header and the second outlet header may be connected to each other side-by-side. The cross-over conduit structure may include a pipe and an insulation material surrounding the pipe.

In some example embodiments, the first outlet header may include a drain collection manifold for supplying the first condensate portion to a drain conduit through the first outlet header and for directing the first gas of the fluid mixture to the cross-over conduit structure. The drain collection manifold may be connected to the cross-over conduit structure.

In some example embodiments, the first stage condenser and the second stage condenser may be connected to each other. The first inlet header and the second outlet header may be connected side-by-side and divided by a first partition. Opposite sides of the first partition may define a drain opening connected through a loop seal which allows liquid flow but limits gas flow from the first inlet header to the second outlet header. The first outlet header and the second inlet header may be connected to each other side-by-side and divided by a second partition. Opposite sides of the second partition may define the first outlet opening and the second inlet opening such that the first outlet opening and the second inlet opening may be in fluid communication through a catalyst in the second partition.

In some example embodiments, the PCCS condenser may further include at least one of a first manway connected to the first inlet header, a second manway connected to the first outlet header, or a second catalyst in the second outlet header.

In some example embodiments, the PCCS condenser may further include a lifting eye structure on at least one of the first inlet header, the first outlet header, the second inlet header, or the second outlet header.

In some example embodiments, the first partition may define a drain opening for allowing the first condensate portion to flow from the first inlet header through the drain opening to the second outlet opening through a liquid loop seal, whose depth prevents gas flow and first stage bypass at the highest condensation rates.

In some example embodiments, the PCCS condenser may further include a concentric vent-and-drain pipe attached to the second outlet header. The vent opening of the second outlet header may be surrounded by the second outlet opening of the second outlet header. The concentric vent-and-drain pipe may include a drain portion in fluid communication with the second outlet opening for supplying the first condensate portion and the second condensate portion to the drain line. The concentric vent-and-drain pipe may include a vent portion that may be surrounded by the drain portion and may be in fluid communication with the vent opening for transmitting the gaseous portion of the fluid mixture to the vent line.

In some example embodiments, the PCCS condenser may further include a support structure. The support structure may include a first pillar and a second pillar that have different heights. The first pillar and the second pillar may be arranged to support the PCCS condenser at an incline such that the first outlet header and the second inlet header may be above the first inlet header and the second outlet header, respectively.

According to some example embodiments, a passive containment cooling system (PCCS) condenser may include a first header assembly, a second header assembly, and a plurality of tubes. The first header assembly may include a first housing and a first partition. The first partition may define a first opening. The first partition may divide an internal cavity of the first header assembly into a first header portion and a second header portion that are in fluid communication with each other via a loop seal in the first opening. The first housing may define a plurality of first tube openings that are spaced apart from each other on a first surface of the first housing. A second surface of the first housing may define an inlet opening for receiving a fluid mixture from an inlet conduit. The second surface of the second housing may define an outlet opening in fluid communication with the second header portion for providing a condensate portion of the fluid mixture to a drain line. The second surface of the second housing may define a vent opening in fluid communication with the second header portion for providing a vapor portion of the fluid mixture to a vent line. The second header assembly may include a second housing and a second partition. The second partition may define a second opening. The second partition may divide an internal space of the second header assembly into a third header portion and a fourth header portion that may be in fluid communication with each other via the second opening. The second housing may define a plurality of second tube openings that may be spaced apart from each other on a first surface of the second housing that faces the first surface of the first housing. The plurality of tubes may include respective ends connected to the first housing and the second housing at the first tube openings and the second tube openings. The plurality of tubes may include first tubes configured to provide a fluid flow path between the first header portion and the third header portion. The plurality of tubes may include second tubes configured to provide a fluid flow path between the second header portion and the fourth header portion.

According to example embodiments, a method of manufacturing a passive containment cooling system (PCCS) condenser includes connecting a first stage condenser to a second stage condenser, and providing a first catalyst in at least one of a first outlet header or a second inlet header. The first stage condenser may include a first inlet header defining a first inlet opening for receiving a fluid mixture from an inlet conduit, the first outlet header defining a first outlet opening, and first channels in fluid communication between the first inlet header and the first outlet header. The first channels may be configured to condense a first condensate portion from a first gas in the fluid mixture, based on heat exchange between the fluid mixture and an external environment through the first channels, as the fluid mixture flows through the first channels from the first inlet header to the first outlet header. The second stage condenser may include a second inlet header defining a second inlet opening in fluid communication through a catalyst with the first outlet opening for receiving the fluid mixture from the first outlet header, the second outlet header defining a second outlet opening for providing a second condensate portion to a drain line and a vent opening for transmitting the gas portion of the fluid mixture to a vent line, and second channels in fluid communication between the second inlet header and the second outlet header. The second channels may be configured to condense the second condensate portion from the first gas, based on heat exchange between the fluid mixture and the external environment through the second channels, as the fluid mixture flows through the second channels from the second inlet header to the second outlet header. The first catalyst may be configured to catalyze a reaction for forming the first gas from a second gas and a third gas in the fluid mixture as the fluid mixture flows through at least one of the first outlet header or the second inlet header.

According to some example embodiments, a passive containment cooling system (PCCS) for a nuclear reactor is provided. The PCCS may include a multi-stage condenser. The multi-stage condenser may include a first header, a second header, a first stage catalyst, a first channel in fluid communication between the first header and the second header, and a second channel. The first header may define a first inlet opening for receiving a fluid mixture. The first channel may be configured to condense a first condensate portion from a first gas in the fluid mixture, based on heat exchange between the fluid mixture and an external environment through the first channel, as the fluid mixture flows through the first channel from the first header to the second header. The second header may include a drain opening for transmitting the first condensate portion of the fluid mixture to a gravity drain reservoir. The first stage catalyst may be in at least one of the first header or the second header. The first stage catalyst may be configured to catalyze a reaction for forming the first gas from a second gas and a third gas in the fluid mixture. A first stage of the multi-stage condenser may include the first header. The second header may be part of a second stage of the multi-stage condenser or the second header may be connected to the second stage of the multi-stage condenser.

BRIEF DESCRIPTION OF THE DRAWINGS

The various features and effects of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION

Figure 1:
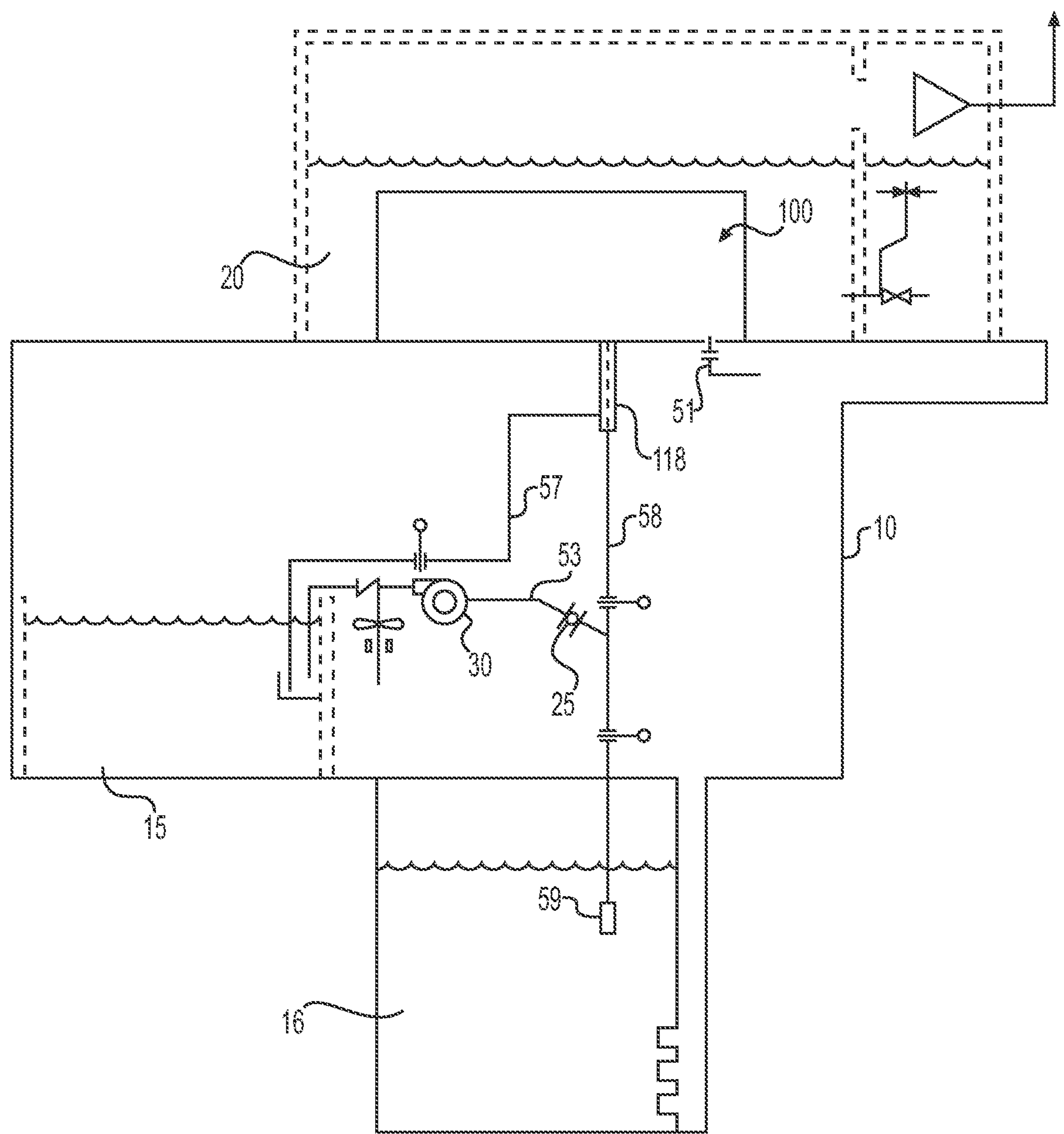
FIG. 1 is a schematic of a portion of a reactor containment according to some example embodiments.

Example embodiments will now be described more fully with reference to the accompanying drawings, in which some example embodiments are shown. Example embodiments, may, however, be embodied in many different forms and should not be construed as being limited to the embodiments set forth herein; rather, these example embodiments are provided so that this disclosure will be thorough and complete, and will fully convey the scope of example embodiments to those of ordinary skill in the art. In the drawings, like reference numerals in the drawings denote like elements, and thus their description may be omitted.

It should be understood that when an element or layer is referred to as being “on,” “connected to,” “coupled to,” or “covering” another element or layer, it may be directly on, connected to, coupled to, or covering the other element or layer or intervening elements or layers may be present. In contrast, when an element is referred to as being “directly on,” “directly connected to,” or “directly coupled to” another element or layer, there are no intervening elements or layers present. Like numbers refer to like elements throughout the specification. As used herein, the term “and/or” includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., “beneath,” “below,” “lower,” “above,” “upper,” and the like) may be used herein for ease of description to describe one element or feature’s relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as “below” or “beneath” other elements or features would then be oriented “above” the other elements or features. Thus, the term “below” may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms “a,” “an,” and “the” are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted may occur out of the order noted in the figures or described in the specification. For example, two figures or steps shown in succession may in fact be executed substantially and concurrently or may sometimes be executed in the reverse order or repetitively, depending upon the functionality/acts involved.

FIG. 1 is a schematic of a portion of a reactor containment according to some example embodiments. Although containment 10 is shown in FIG. 1 having components and characteristics of an Economic Simplified Boiling Water Reactor (ESBWR), it is understood that components described therein are usable with other plant configurations. For ease of description, FIG. 1 is described for a case where the coolant fluid is water; however, example embodiments are not limited thereto. Although not illustrated in FIG. 1, the containment 10 may be connected to a reactor and may include a return path of condensate to the reactor.

Referring to FIG. 1, the containment 10 may include a gravity-driven coolant system (GDCS) pool 15, a suppression pool 16, and a PCCS pool 20. The GDCS pool 15 may be a large water-filled tank used to cool a reactor vessel in the event of a loss of primary coolant. The suppression pool 16 may be a water-filled tank used to condense a first gas (e.g., steam) from the reactor vessel and relieve pressure in the event of an accident. The suppression pool 16 may be a tank filled with water and/or other fluids. One or more PCCS condensers with the region marked 100 may be arranged in the PCCS pool 20, outside of the containment 10. The PCCS condensers 100 may be multi-stage PCCS condensers submerged in the PCCS pool 20. The PCCS condensers 100 may be configured to remove additional heat and condense steam within containment 10 during a loss of coolant accident within the containment 10.

The PCCS condensers 100 receive a fluid mixture (e.g., steam and noncondensable gasses such as $N_2$, $O_2$ and $H_2$) through an inlet conduit 51 within containment 10 during a severe accident. The first gas (e.g., steam) may be formed from boiling coolant in the reactor, and the noncondensable gasses (e.g., $N_2$, $O_2$ and $H_2$) may inert ($N_2$) and/or accumulate within the reactor and containment 10 during operation of the nuclear plant from radiation and chemical release ($O_2$ and $H_2$). The inlet conduit 51 may transport the steam and noncondensable gasses to the PCCS condenser 100. The PCCS condenser 100 may transfer heat from the steam and noncondensable gasses to the PCCS pool 20; consequently, the first gas (e.g., steam) within the PCCS condenser 100 may condense into water.

From the PCCS condenser 100, the condensed part of the first gas (e.g., liquid) may be driven by gravity and a pressure differential downward through a concentric vent-and-drain conduit 118 described in FIG. 1. The vent-and-drain conduit 118 may be formed of stainless steel, such as SA312 Grade TP304L, but example embodiments are not limited thereto. The vent-and-drain conduit 118 may include two concentric pipes that provide an inner and outer passage in an annular duct. Condensate (e.g., condensed liquid water) may flow through the outer pipe of annular duct into a shared drain line 57, which drains the condensed water into GDCS pool 15. From the PCCS condenser 100, noncondensable gasses flow downward through the inner passage of the vent-and-drain conduit 118 into the vent line 58. The vent line 58 terminates at a sparger 59 in the suppression pool 16. A fan 30 may be connected to the vent line 58 through a valve 25 and a fan-line pipe 53 to enhance noncondensable flow out of PCCS condensers 100. The valve 25 may be a ball valve and may be formed of stainless steel, such as SA351 grade CF8M/CF3M steel. The fan 30 may be an explosion-proof fan (e.g., fan with anti-sparking materials) with stainless steel internal parts.

The inlet conduit 51, fan-line pipe 53, drain line 57, and vent line 58 may be formed of stainless steel, such as SA 312 Grade TP304L steel, but example embodiments are not limited thereto. The GDCS pool 15, suppression pool 16, and PCCS pool 20 may each include a stainless steel liner. The containment 10 may be formed of carbon steel. The sparger 59 may be formed of stainless steel, such as SA 182 Grade F304L. However, example embodiments are not limited thereto.

Figure 2:
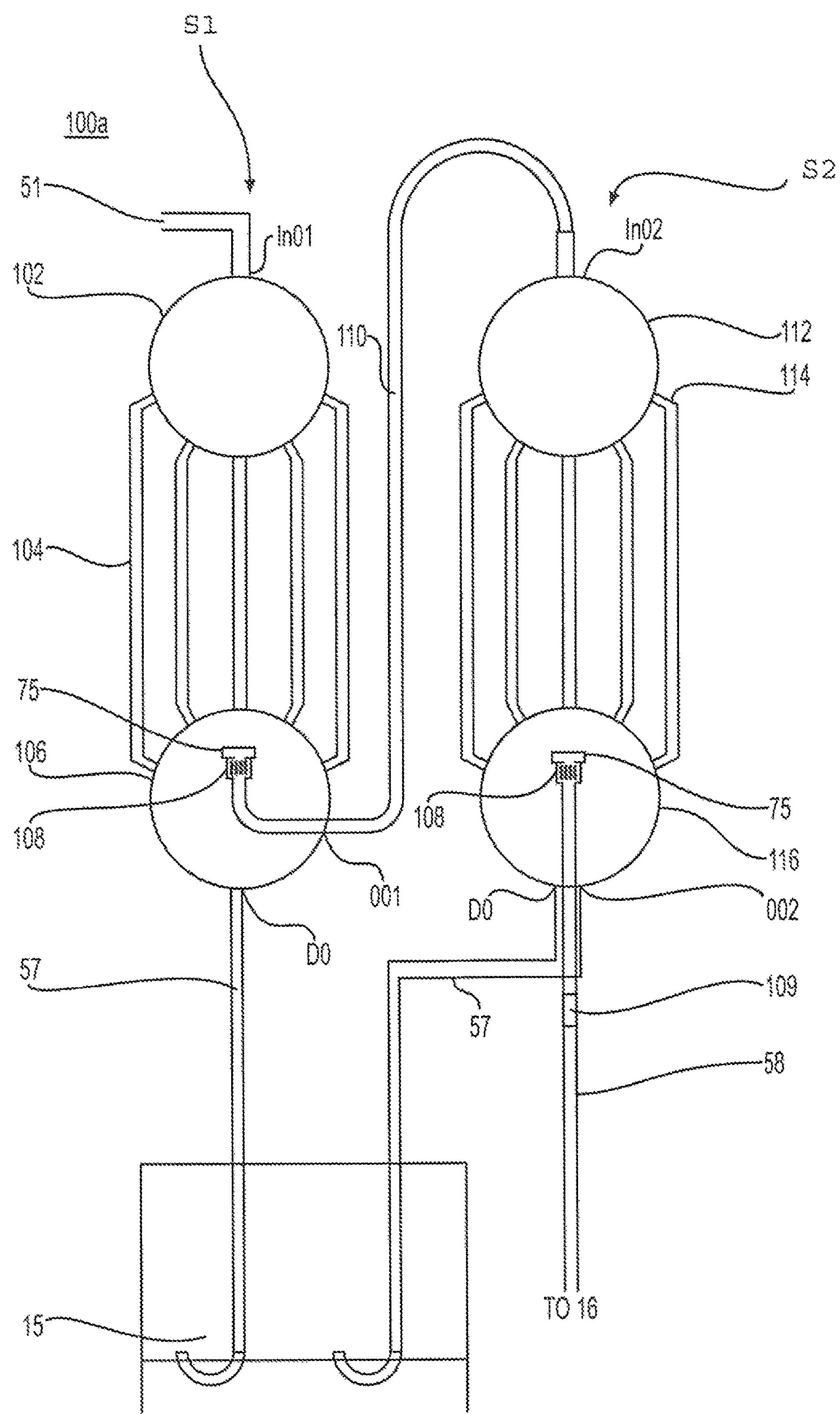
FIG. 2 is a side view of a multi-stage passive containment cooling system (PCCS) condenser according to some example embodiments.

FIG. 2 is a side view of a passive containment cooling system (PCCS) condenser according to some example embodiments.

Referring to FIG. 2, a multi-stage PCCS condenser **100*a* according to some example embodiments may include a first stage condenser S1 spaced apart from a second stage condenser S2. The first stage condenser S1 may include a first inlet header 102, a first outlet header 106 defining a first outlet opening OO1, and first channels 104 in fluid communication between the first inlet header 102 and the first outlet header 106. The first inlet header 102 may define a first inlet opening InO1 for receiving a fluid mixture from the inlet conduit 51. The inlet conduit 51 may be connected to the first inlet opening InO1**. The fluid mixture may include a first gas (e.g., steam), a second gas (e.g., $H_2$), and a third gas (e.g., $O_2$), but is not limited thereto.

The PCCS condenser **100*a* may further include a catalyst 108 in at least one of the first outlet header 106 or a second inlet header 112 of a second stage condenser S2 connected to the first outlet header 106. The catalyst 108 may be configured to catalyze a reaction for forming the first gas (e.g., steam) from the second gas (e.g., $H_2$) and the third gas (e.g., $O_2$) in the fluid mixture as the fluid mixture flows through the first outlet header 106 and/or second inlet header 112. The first gas may be a condensable gas and the second and third gases may be non-condensable gases. The second and third gases may be combustible. The second outlet header 116 may also include the catalyst 108 adjacent to the second outlet opening OO2 to reduce the likelihood of detonation from remaining amounts the second gas (e.g., $H_2$) and the third gas (e.g., $O_2$) entering the vent line 58**.

The catalyst 108 may include at least one of palladium (Pd), platinum (Pt), rhodium (Rh), alloys thereof, or a combination thereof, but is not limited thereto. The catalyst 108 may be a catalyst assembly that includes catalyst (e.g., Pd, Pt, Rh, alloys thereof, combination thereof) coated on a stainless steel structure. Instead of a separate catalyst 108 structure, or in addition to the catalyst 108 structure, a catalyst coating (see coating 107 in FIG. 3) may be coated on inner surfaces of the first outlet header 106 and/or second inlet header 112. Any one of the catalyst materials used for the catalyst 108 may be used for the catalyst coating (see coating 107 in FIG. 3).

The first channels 104 may be configured to condense a first condensate portion (e.g., water liquid) from a first gas (e.g., steam) in the fluid mixture, based on heat exchange between the fluid mixture and an external environment (e.g., PCCS pool 20 in FIG. 1) through the first channels 104, as the fluid mixture flows through the first channels 104 from the first inlet header 102 to the first outlet header 106. The first channels 104 may be submerged in the PCCS pool 20, and heat exchange with the PCCS pool 20 may condense some of the first gas from the fluid mixture flowing through the first channels 104. The first channels 104 may be pipes. The first channels 104 may be formed of stainless steel, such as SA312 TPXM-19, but example embodiments are not limited thereto.

The first outlet header 106 may separate the first condensate portion (e.g., condensed water) and the second and third gases (e.g., steam, $H_2$ and $O_2$) and direct the fluids such that the first condensate portion may flow from the first outer header 106 to the GDCS pool 15 via DO and condensate drain line 57 for use as reactor coolant without the second and third gases causing blocked or reverse flow. The second and third gases (e.g., $H_2$ and $O_2$), along with a remaining amount of the first gas (e.g., steam), may flow through a cross-over conduit 110 surrounded by insulation 120 (see FIG. 3 for insulation 120) from the first outlet header 106 to the second inlet header 112.

Figure 3:
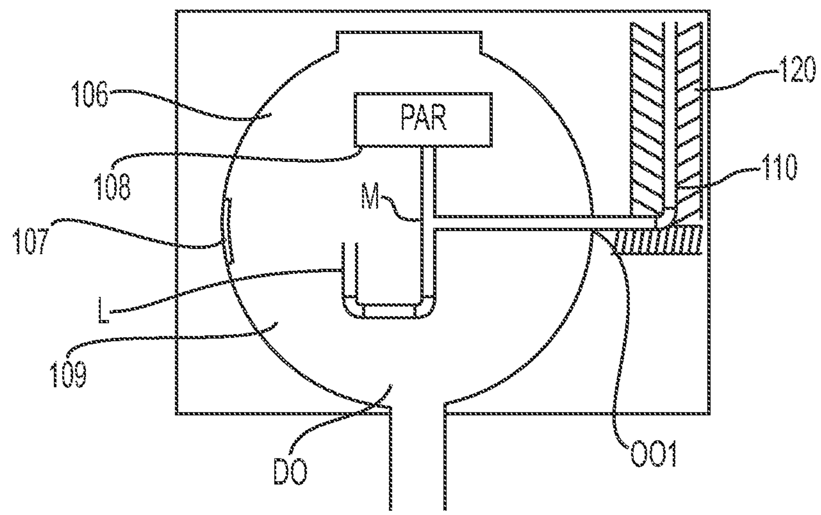
FIG. 3 is a sectional view of a header connected to an insulated crossover pipe in a multi-stage PCCS condenser according to some example embodiments.

The first condensate portion (e.g., liquid water) from the first outlet header 106 may be collected and transported to the GDCS pool 15 through the drain line 57. As shown in FIG. 3, the second and third gases (e.g., steam, $H_2$ and $O_2$), along with a remaining amount of the first gas, may flow through a cross-over conduit structure surrounded by insulation 120 from the first outlet header 106 to the second inlet header 112.

The catalytic reaction, using the catalyst 108 for forming the first gas (e.g., steam) from the second gas (e.g., $H_2$) and the third gas (e.g., $O_2$), may generate heat. The heat generated from the catalytic reaction may also convert part of the first condensate portion (e.g., water liquid) into the first gas (e.g., steam). A second stage condenser S2 may be provided to remove heat from the first gas generated due to the catalytic reaction. Thus, the second stage condenser S2 may condense an additional amount of the first gas. In a general system without the second stage condenser S2, the additional amount of the first gas could flow through a vent line to the suppression pool 16 and increase the pressure of the containment.

The second stage condenser S2 may include the second inlet header 112, a second outlet header 116, and second channels 114 in fluid communication between the second inlet header 112 and the second outlet header 116. The second inlet header 112 may define a second inlet InO2 opening in fluid communication with the first outlet opening OO1 of the first outlet header 106 for receiving the fluid mixture (e.g., steam, $H_2$, and $O_2$) from the first outlet header 106. The first outlet header 106 and the second inlet header 112 may be in fluid communication via a cross-over conduit (e.g., pipe) surrounded by insulation 120. Respective ends of the cross-over conduit may connect to the first outlet opening OO1 and the second inlet opening InO2.

The second channels 114 may be being configured to condense a second condensate portion (e.g., water liquid) from the first gas (e.g., steam), based on heat exchange between the fluid mixture (e.g., steam, $H_2$, and $O_2$, etc.) and the external environment (e.g., PCCS pool 20) through the second channels 114, as the fluid mixture flows through the second channels 114 from the second inlet header 112 to the second outlet header 116. The second outlet header 116 may define a second outlet opening DO for providing the second condensate portion (e.g., liquid water) to a drain line 57. The second outlet header 116 may define a vent opening for transmitting a portion (e.g., remaining steam and $H_2$ and $O_2$) of the fluid mixture to a vent line 58. The second channels 114 may be steel pipes. The second channels 114 may be formed of stainless steel, such as SA312 TPXM-19, but example embodiments are not limited thereto.

The second outlet header 116 may include a drain collection manifold that separates the condensate portion (e.g., condensed water) and the second and third gases (e.g., $H_2$ and O2). In this way, the condensate portion may flow back into GDCS pool 15 for use as reactor coolant without the second and third gases causing blocked or reverse flow, through the drain line 57, and the uncondensed gases can vent through the vent line 58.

From the second outlet header 116, noncondensable gasses (e.g., H2 and O2) flow into the vent line 58, and the second condensate portion (e.g., liquid water) may flow downward into the drain line 57 towards the GDCS pool 15. Each drain line 57 has a loop seal in the GDCS pool 15 which prevents gas from flowing from the first stage outlet 106 to the second stage outlet 116. This prevents gas bypassing the second stage channels 114.

In the multi-stage PCCS condenser 100*a*, the first inlet header 102 may be an upper header above the first outlet header 106, and the first outlet header 106 may be a lower header. The second inlet header 112 may be an upper header above the second outlet header 116, and the second outlet header 116 may be a lower header. The inlet and outlet headers 102, 106, 112, and 116 may be formed of stainless steel, such as SA-182 FXM-19, but example embodiments are not limited thereto.

The PCCS condenser may further include the catalyst 108 in the second outlet header 116 for catalyzing a reaction for forming the first gas (e.g., steam) from the second gas (e.g., $H_2$) and the third gas (e.g., $O_2$). The material of the catalyst 108 in the first outlet header 106 or the second inlet header 112 may be the same type of material or different than the catalyst 108 in the second outlet header 116.

In the PCCS condenser 100*a* and PCCS condensers 100*b* and 100*c* (described later with reference to FIGS. 4A to 4C and 5A to 5B), components of the first stage condenser S1 may be the same size or different sizes as corresponding components in the second stage condenser S2. In the PCCS condenser 100*a* and PCCS condensers 100*b* and 100*c* (described later with reference to FIGS. 4A to 4C and 5A to 5B), a heat-transfer area corresponding to the first channels 104 may be greater than or equal to a heat-transfer area corresponding to the second channels 114, and/or an overall size of the first stage condenser S1 may be greater than or equal to an overall size of the second stage condenser S2. For example, in the PCCS condenser 100*a* and PCCS condensers 100*b* and 100*c* (described later with reference to FIGS. 4A to 4C and 5A to 5B), a diameter, length, and/or number of the first channels 104 may be greater than or equal to a diameter, length, and/or number of the second channels 114. Also, in the PCCS condenser 100*a* and PCCS condensers 100*b* and 100*c* (described later with reference to FIGS. 4A to 4C and 5A to 5B), a volume of the first inlet header 102 may be greater than or equal to a volume of the second inlet header 112. A volume of the first outlet header 106 may be greater than or equal to a volume of the second outlet header 116. The amount of the first gas in the second stage is smaller than the amount in the first stage, which allows optimization of the relative heat transfer area, and a more compact system.

The first stage condenser S1 of the PCCS condenser 100*a* does not have a vent line discharging the second and third gases (e.g., $H_2$ and $O_2$), along with a remaining amount of the first gas (e.g., steam) or $N_2$, from the first outlet header 106 to the suppression pool 16. Instead, the first outlet header 106 of the first stage condenser S1 vents the second and third gases (e.g., $H_2$ and $O_2$), along with a remaining amount of the first gas (e.g., steam) or $N_2$, to the second inlet header 112 of the second stage condenser S2.

Because the catalyst 108 in the first outlet header 106 (and/or second inlet header 112) may convert the second and third gases (e.g., $H_2$ and $O_2$) into the first gas (e.g., steam), as well as generate heat from the catalytic reaction, the fluid mixture flowing into the second channels 114 may have an amount of the first gas generated by the catalytic reaction. The second channels 114 of the second stage condenser S2 may condense the first gas (e.g., steam) that would otherwise be discharged into the vent line 58 and potentially increase containment pressure. Thus, the PCCS condenser 100*a* may remove energy from the first gas from the containment 10, versus heating the suppression pool 16.

In the PCCS condenser 100*a*, the first stage condenser S1 and the second stage condenser S2 may both be in fluid communication with a drain line 57 to the GDCS pool 15, at the first outlet header 106 and the second outlet header 116 respectively. The drain line 57 captures liquid of the first and second condensate portions, and routes the liquid back to the reactor, where the liquid may provide cooling of the reactor core. The vent line 58 arrangement allows the condensate to separate and flow to the drain line 57, which limits and/or prevents losing coolant (e.g., first gas in the fluid mixture) to the suppression pool 16.

According to some example embodiments, a method of manufacturing the PCCS condenser 100*a* may include connecting the first stage condenser S1 to the second stage condenser S2, and providing the catalyst in at least the first outlet header 106 and/or second inlet header 112 (see FIG. 2). The catalyst may be the catalyst coating 107 (see FIG. 3), catalyst structure 108, and/or additional catalyst 109 near the drain opening DO of the first outlet header 106 (see FIG. 3). The method may further include placing the catalyst in the second outlet header 116.

FIG. 3 is a sectional view of a header connected to an insulated crossover pipe in a PCCS condenser according to some example embodiments.

Referring to FIG. 3, in some example embodiments, the cross-over conduit structure 110 may provide a fluid flow path between the first outlet header 106 and the second inlet header 112 (see FIG. 2). The cross-over conduit structure 110 may be a pipe formed of stainless steel (e.g., SA312 Grade TP304L). The cross-over conduit structure 110 may be sealed to the first outlet opening OO1 and the second inlet opening InO2 (see FIG. 2).

A first part of the cross-over conduit structure 110 may extend into first outlet header 106. The first part of the cross-over conduit structure 110 may include a tee M. The tee M may split an end region of the cross-over conduit structure 110 into a loop seal L at a terminal portion and another portion that extends towards the catalyst 108. The catalyst 108 may be a passive re-combiner assembly (PAR). The tee M and loop seal L may be stainless steel. Additionally, or in the alternative, the catalyst may be coated on an inner surface of the first outlet header 106, second inlet header 112 (see FIG. 2), and/or second outlet header 116 to form a catalyst coating 107 (e.g., Pd, Pt, Rh coating). Furthermore, the second outlet header 116 (see FIG. 2) may include a separate catalyst structure 109, such as a stainless steel structure with catalyst (e.g., Pt, Pd, and/or Rh) coated thereon near then drain opening DO. The loop seal L may return any condensate in the cross-over conduit to the first stage drain system, 57. In other words, the loop seal L and the insulation limits and/or prevents liquid from flowing through the cross-conduit structure 110. A portion of the cross-over conduit structure 110 between the first outlet header 106 and second inlet header 112 may be surrounded by insulation 120. The insulation 120 include an insulating material to reduce heat exchange between the cross-over conduit structure 110 and the PCCS pool 20. Alternatively, the insulation 120 may be a guard pipe or tube that surrounds the portion of the cross-over conduit structure 110 between the first outlet header 106 and second inlet header 112.

The first outlet header 106 may define a drain opening DO that may collect the first condensation portion (e.g., condensed steam) in the first outlet header 106 and provide the first condensate portion to the drain line 57 (see FIG. 2). The drain opening DO in the first outlet header 106 may be spaced apart from the first outlet opening OO1 of the first outlet header 106.

The portion of cross-over conduit structure 110 surrounded by insulation 120 rises through the PCCS pool 20 (see FIG. 1). Heat transfer to the crossover conduit structure 110 may cause condensation of the first gas (e.g., steam) in the fluid mixture (e.g., steam, $H_2$, $O_2$, and possibly $N_2$). To return the condensation to the GDCS pool 15 (see FIG. 1), where it can cool the reactor, without bypassing the catalyst or plugging the cross-over conduit, the loop seal L may be provided in the first outlet header 106.

The catalyst 108 may be placed at the top of the cross over pipe, in which case there is less buoyancy driving the cross over flow and reducing pressure drop. Any condensate formed in the crossover pipe 110 may drain into the loop seal L. The draining condensate may build up to form a solid liquid slug before overflowing into the first outlet header 106, where the drain line 57 may collect return the condensate to the GDCS pool 15. The cross over pipe 110 may be sized with a sufficiently large diameter to allow countercurrent flow of gas to the second inlet header 112, with reverse liquid flow of cross over pipe condensate to the loop seal L in the first outlet header 106.

Figure 4A:
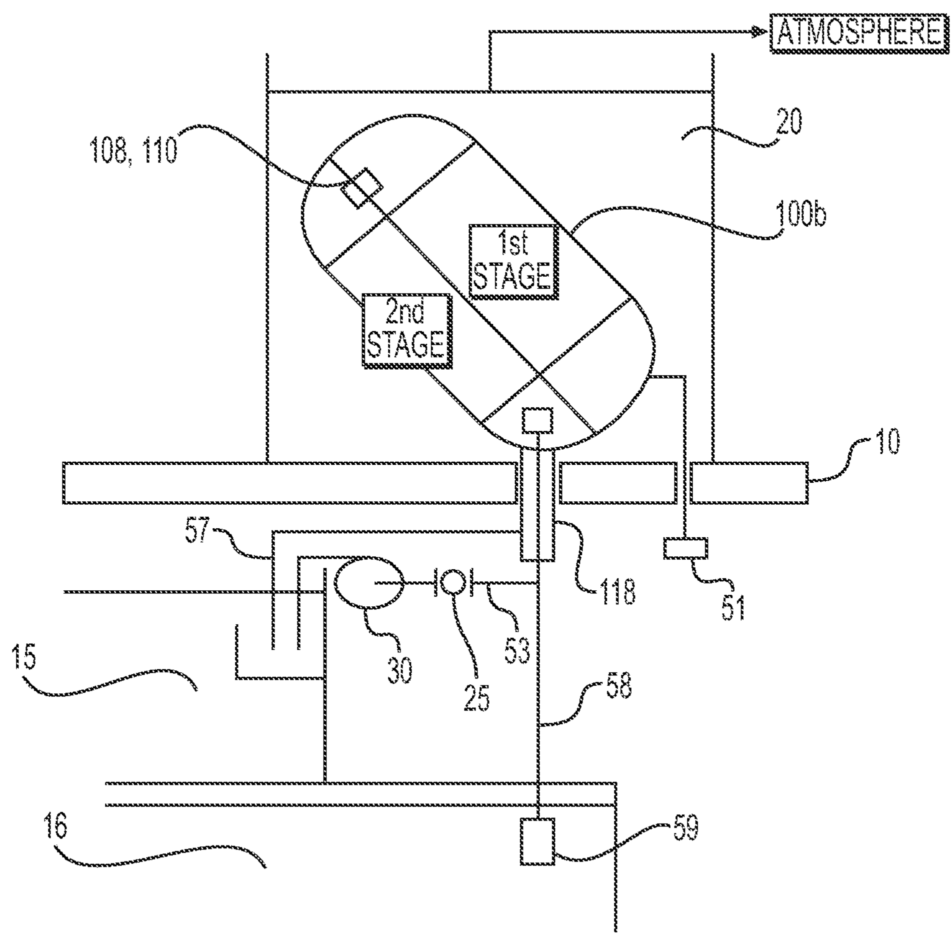
FIG. 4A is a schematic of a portion of a reactor containment including a multi-stage PCCS condenser according to some example embodiments.

FIG. 4A is a schematic of a portion of the reactor containment including a PCCS condenser according to some example embodiments.

Referring to FIG. 4A, the containment 10 may be the same as or substantially the same as the containment 10 discussed in FIG. 1, except the PCCS condenser 100*b* may be submerged in the PCCS pool 20 instead of the PCCS condenser 100*a*.

Figure 4B:
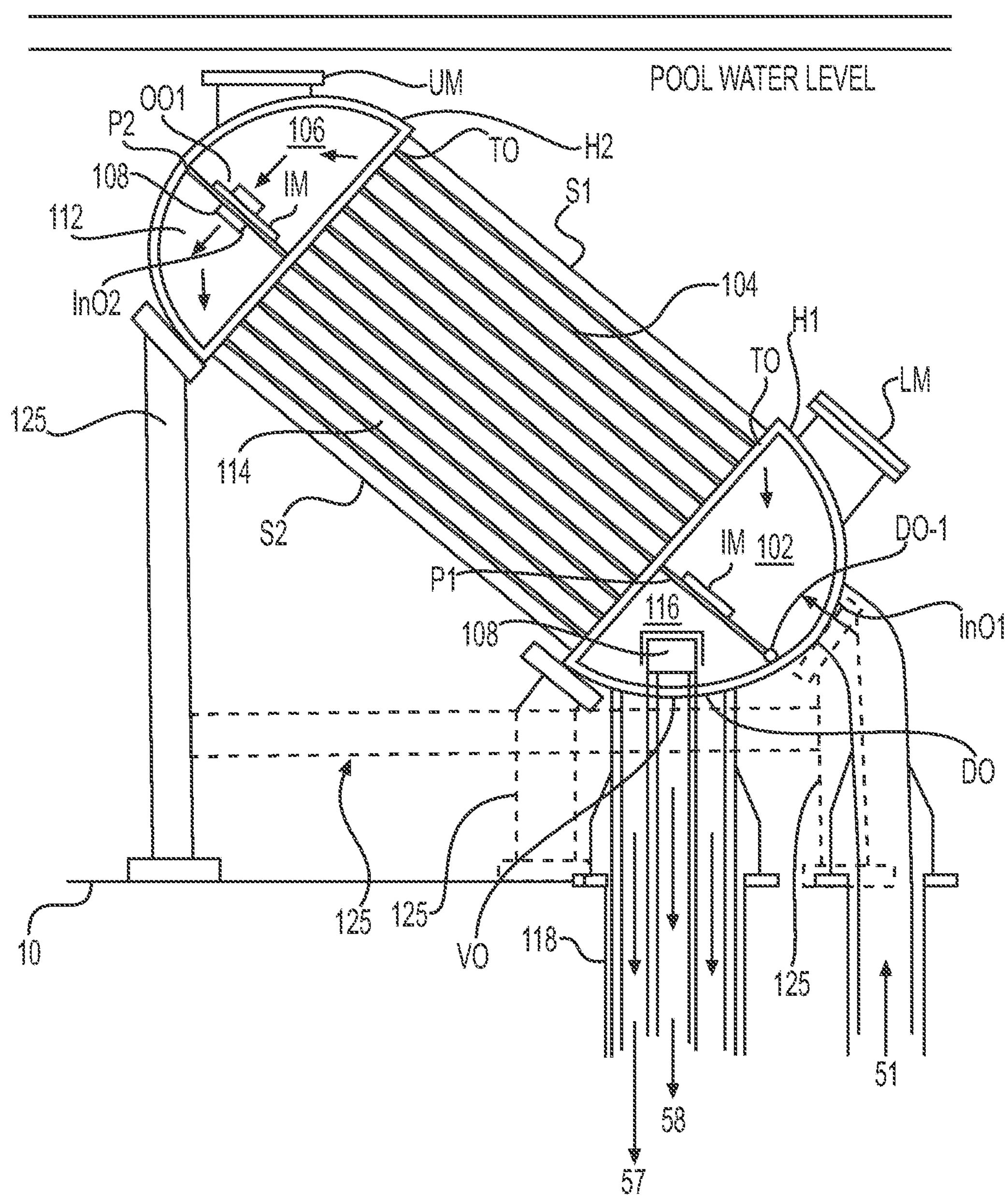
FIG. 4B is a sectional view of the multi-stage PCCS condenser in FIG. 4A.
Figure 4C:
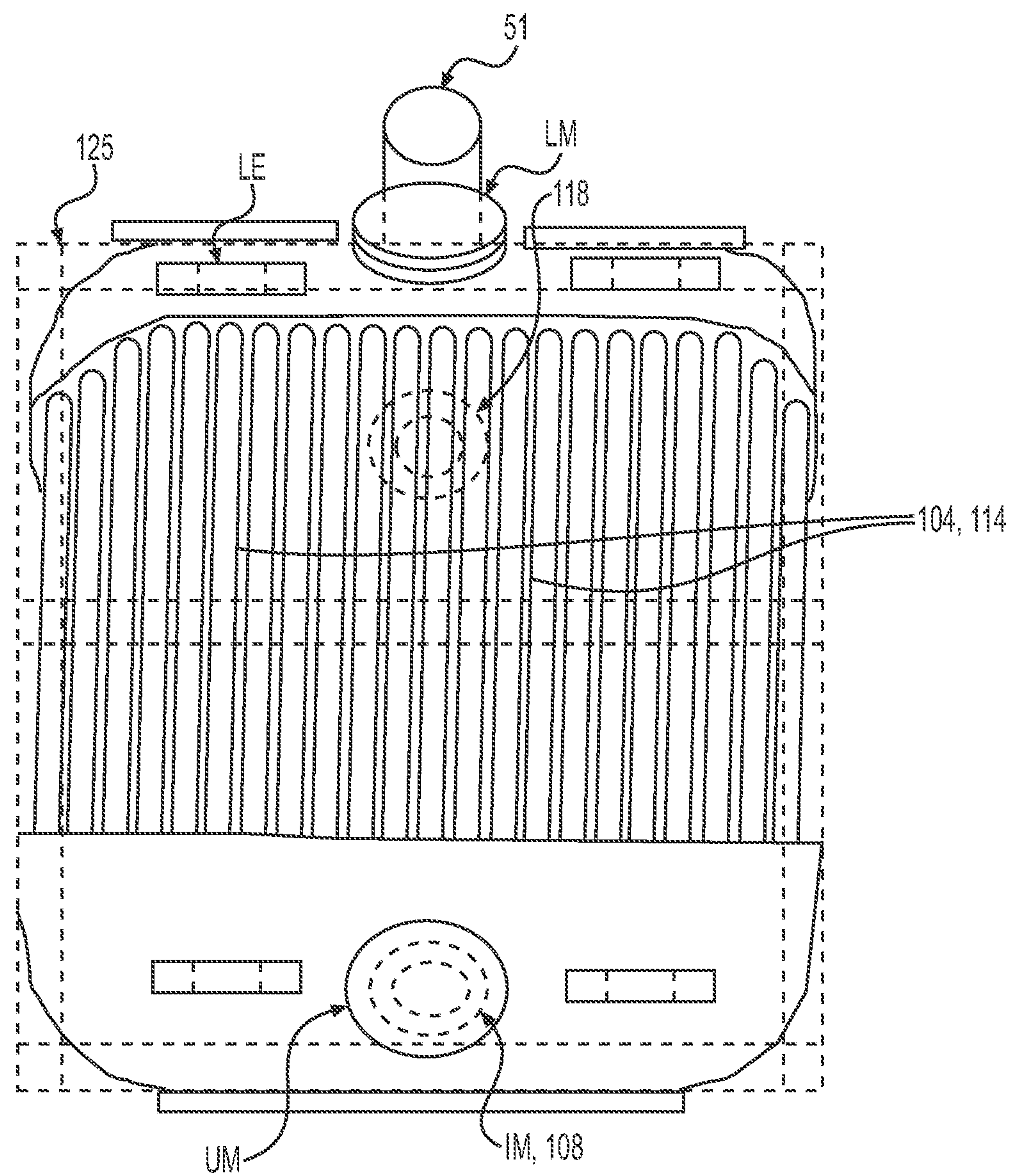
FIG. 4C is a top view of the multi-stage PCCS condenser in FIGS. 4A and 4B.

FIG. 4B is a sectional view of the PCCS condenser 100*b* in FIG. 4A, and FIG. 4C is a top view of the PCCS condenser 100*b* in FIGS. 4A and 4B.

Referring FIGS. 4A to 4C, a multi-stage PCCS condenser 100*b* according to some example embodiments may include a first stage condenser S1 and a second stage condenser S2. The PCCS condenser 100*b* may include a first header assembly H1 and a second header assembly H2 spaced apart from each other. The first header assembly H1 may include a first housing and a first partition P1. The first partition P1 may include a first opening DO-1, which may function as a drain opening. The first partition P1 may divide an internal cavity of the first header assembly H1 into a first header portion corresponding to a first stage inlet header 102 and a second header portion corresponding to a second stage outlet header 116.

The first housing of the first header assembly H1 may define a plurality of first tube openings TO that are spaced apart from each other on a first surface of the first housing. The first stage inlet header 102 and the second stage outlet header 116 may be in fluid communication with each other through the first opening DO-1; however, the size of the first opening DO-1 may be relatively small and the directed through a loop seal (similar to the loop seal L shown in FIG. 3) so only condensate enters the second outlet header 116 and the gases are precluded from bypassing the tubes 104. The first opening DO-1 may allow condensate to drain from the first inlet header 102 to the second outlet header 116. The first partition P1 may have an internal manway IM for inspection access and may be formed of stainless steel (e.g., SA 312 Grade TP304L). A size of the first opening DO-1 may be smaller than a size of a first inlet opening InO1 and/or smaller than a size of a drain opening DO defined by the housing of the first header assembly H1.

A second surface of the first housing for the first header assembly H1 may define a first inlet opening InO1 for receiving a fluid mixture (e.g., steam, $H_2$, $O_2$) through the inlet conduit 51. The inlet conduit 51 may be connected to the first inlet opening InO1. The first inlet opening InO1 may be in fluid communication with the first inlet header 102 to receive the fluid mixture from the inlet conduit 51. The second surface of the first housing of the first header assembly H1 may define a drain opening DO, in fluid communication with the second outlet header 116, for providing a condensate portion (e.g., liquid water) to the drain line 57. The drain line 57 may be connected to the drain opening DO at the second stage outlet header 116. The second surface of the first housing of the first header assembly H1 may define a vent opening VO in fluid communication with the second stage outlet header 116 for providing a vapor portion (e.g., $H_2$, $O_2$) of the fluid mixture to the vent line 58. The vent opening VO may be may be connected with the vent line 58 at the second outlet header 116.

In some example embodiments, other than a minimum initial leakage bypass flow before condensate builds up, there may be no direct vent path from the first stage inlet header 102 to the second stage outlet header 116. The first to third gases (e.g., steam, $H_2$, and $O_2$) may be forced to go through the first channels 104 to the first stage outlet header 106 to the second stage inlet header 112, through a catalyst 108, to the second stage outlet header 116 where they may then go through final catalyst 108 and down through the combined vent-and-drain conduit 118. The first channels 104 may be sized to allow counter-current flow of gas and condensate.

As shown in FIG. 4B, the drain opening DO may surround the vent opening VO. The drain line 57 and the vent line 58 may be arranged as a combined vent-and-drain conduit, where the drain line 57 surrounds the vent line 58. Condensate (e.g., condensed liquid water) may flow through drain line 57 to the GDCS pool 15 (see FIG. 1). From the PCCS condenser 100*b*, noncondensable gasses (e.g., $O_2$, $H_2$, $N_2$) may flow through the vent line 58 to a sparger 59 in the suppression pool 16 (see FIG. 1).

The second header assembly may include a second housing and a second partition P2. The second partition P2 divides an internal space (or cavity) of the second header assembly H2 into a third header portion corresponding to a first stage outlet header 106 and a fourth header portion corresponding to second stage inlet header 112. The first stage outlet header 106 and the second stage inlet header 112 may be in fluid communication with each other. The second partition P2 may define a second opening to allow fluid mixture (e.g., steam, $H_2$, $O_2$, $N_2$) to flow from the first outlet header 106 to the second inlet header 112. The second partition P2 may be a flange and may be formed of stainless steel (e.g., SA 312 Grade TP304L).

The opening in the second partition P2 at a side facing the first outlet header 106 may be referred to as the first outlet opening OO1. The opening in the second partition P2 at a side facing the second inlet header 112 may be referred to as the second inlet opening InO2. Catalyst 108 may be placed in the flow path between the first outlet opening OO1 and the second inlet opening InO2. The second housing of the second housing assembly H2 may define a plurality of second tube openings TO that are spaced apart from each other on a first surface of the second housing of the second housing assembly H2 that faces the first surface of the first housing of the first housing assembly H1.

The first header assembly H1 and the second header assembly H2 may be connected to each other through first channels 104 and second channels 114. The first channels 104 and second channels 114 may be in fluid communication with internal volumes of the first header assembly H1 and the second header assembly H2 through tube openings TO defined by surfaces of the first header assembly H1 and second header assembly H2 that face each other. Respective ends of the first channels 104 and the second channels 114 may be connected to the tube openings TO. The first channels 104 and the second channels 114 may be embodied as a plurality of tubes, such as pipes. In other words, the first channels 104 may be a plurality of first tubes configured to provide a fluid flow path between the first header portion and the third header portion, the first stage inlet header 102 and the first stage outlet header 106, respectively. The second channels 114 may be a plurality of second tubes configured to provide a fluid flow path between the second stage inlet header 112 and the second stage outlet header 116.

In the PCCS condenser 100*b*, the first stage condenser may include the first stage inlet header 102, the first stage outlet header 106 defining the first outlet opening OO1, and the first stage channels 104 in fluid communication between the first stage inlet header 102 and the first stage outlet header 106. The first stage inlet header 102 may define a first inlet opening InO1 for receiving a fluid mixture (e.g., mixture including steam, $N_2$, $H_2$, and $O_2$) through an inlet conduit 51. The second stage condenser may include the second stage inlet header 112, the second stage outlet header 116, and the second stage channels 114 in fluid communication between the second stage inlet header 112 and the second stage outlet header 116. The second stage inlet header 112 may define the second inlet opening InO2 in fluid communication with the first outlet opening OO1 of the first stage outlet header 106 for receiving the fluid mixture (e.g., steam, $N_2$, $H_2$, and $O_2$) from the first stage outlet header 106. The first stage condenser and the second stage condenser may be formed of stainless steel.

The first channels 104 may be configured to condense a first condensate portion (e.g., liquid water) from a first gas (e.g., steam) in the fluid mixture (e.g., steam, $N_2$, $H_2$, and $O_2$), based on heat exchange between the fluid mixture and an external environment (e.g., PCCS pool 20) through the first channels 104, as the fluid mixture (e.g., steam, $H_2$, $O_2$) flows through the first stage channels 104 from the first stage inlet header 102 to the first stage outlet header 106. The first stage channels 104 may be submerged in the water (and/or other fluid) of the PCCS pool 20. The PCCS condenser 100*b* may be submerged in the water (and/or other fluid) of the PCCS pool 20.

A catalyst 108 may be in at least one of the first outlet header 106 or a second inlet header 112 of a second stage condenser. The catalyst 108 (e.g., Pd, Pt, Rh, alloys thereof, or a combination thereof) may be configured to catalyze a reaction for forming the first gas (e.g., steam) from a second gas (e.g., $H_2$) and a third gas ($O_2$) in the fluid mixture as the fluid mixture flows through the at least one of the first outlet header 106 or the second inlet header 112. Instead of a separate catalyst 108 structure, or in addition to the catalyst 108 structure, a catalyst coating (e.g., Pd, Pt, Rh, alloys thereof, or a combination thereof, see coating 107 in FIG. 3) may be coated on inner surfaces of the first outlet header 106 and/or second inlet header 112. The catalyst 108 (e.g., Pd, Pt, Rh, alloys thereof, or a combination thereof), and/or catalyst coating 107, (see coating 107 in FIG. 3) may be accessed from a manway described later in more detail.

The catalyst 108 may be in the first outlet header 106 and/or the second inlet header 112 and adjacent to the openings OO1 and InO2 in the second partition P2. The catalyst 108 may be in a flow path of the fluid mixture (e.g., steam, $H_2$, $O_2$) flowing from the first outlet header 106 to the second inlet header 112. The catalyst 108 may be connected to the second partition P2. The catalyst 108 may also be provided in the second outlet header 116. Also, a catalyst coating 107 (see coating 107 in FIG. 3) may be coated on inner surfaces of the second outlet header 116.

The second stage channels 114 may be configured to condense a second condensate portion (e.g., water liquid) from the first gas (e.g., steam), based on heat exchange between the fluid mixture (e.g., steam, $H_2$, and $O_2$, etc.) and the external environment (e.g., PCCS pool 20) through the second stage channels 114, as the fluid mixture flows through the second stage channels 114 from the second stage inlet header 112 to the second stage outlet header 116. The second stage outlet header 116 may define the second outlet opening for providing the second condensate portion (e.g., liquid water) to a drain line 57. The second stage outlet header 116 may define a vent opening VO for transmitting a portion (e.g., remaining steam, $N_2$, and $H_2$ and $O_2$) of the fluid mixture to a vent line 58. The second channels 114 may be pipes. The second stage channels 114 may be formed of stainless steel, such as SA312 TPXM-19, but example embodiments are not limited thereto. The first partition P1 may be a blind flange. A drain opening DO defined at a base of the first partition P1 may allow the first condensate portion P1 (e.g., liquid water) to drain from the first inlet header 102 to the second outlet header 116 and drain through the drain line 57. The first condensate portion may be drained through a loop seal.

In the PCCS condenser 100*b*, the first stage condenser S1 and the second stage condenser S2 may be connected to each other. The first stage inlet header 102 and the second stage outlet header 116 may be connected to each other side-by-side and divided by the first partition P1. Even though FIG. 4B illustrates a non-limiting example where the first partition P1 defines a drain opening DO-1 that allows condensate (e.g., liquid water) to drain from the first stage inlet header 102 to the second stage outlet header 116, example embodiments are not limited thereto. The drain opening DO-1 optionally may be omitted, in which case the first stage inlet header 102 and the second outlet header 116 may not be in fluid communication directly with each other, in which case an additional drain conduit would be provided in the first stage inlet header 102. A loop seal and/or one-way valve may be arranged in the drain opening DO-1 to limit and/or prevent counter flow from the second stage outlet header 116 to the first inlet stage header 102 and prevent gas bypass of the channels 104 and 114. The first stage outlet header 106 and the second stage inlet header 112 may be connected to each other side-by-side and divided by the second partition P2. Opposite sides of the second partition P2 may define the first outlet opening OO1 and the second inlet opening InO2 such that the first outlet opening OO1 and the second inlet opening InO2 may be in fluid communication through the second partition P2.

The PCCS condenser 100*b* may be supported by a support structure 125 on the containment 10. The support structure 125 may be formed of stainless steel such as SA240 XM-19, but is not limited thereto. The support structure 125 may include at least one first pillar and at least one second pillar that have different heights, and a horizontal portion may be joined to the at least one first pillar and the at least one second pillar. The support structure 125 may cradle upper and lower portions of the PCCS condenser 100*b*. The first pillar and the second pillar of the support structure 125 may support opposite ends of the PCCS condenser 100*b*. The first pillar and the second pillar of the support structure 125 may be arranged to support the PCCS condenser 100*b* such that the first stage outlet header 106 and the second stage inlet header 112 are at a heights above the first stage inlet header 102 and the second stage outlet header 116, respectively. For example, FIG. 4B illustrates a support structure 125 that include a first pillar supporting the second header assembly H2 and two second pillars supporting the first header assembly H1.

Referring to FIGS. 4B and 4C, the PCCS condenser 100*b* may further include one or more lower manways LM connected to the first inlet header 102 and one or more upper manways UM connected to the first outlet header 106 for providing access to the first inlet header 102 and the first outlet header 106, respectively. Through the lower and upper manways LM and UM, the internal manways IM may be used to access structures inside the header assemblies H1 and H2. As an example, FIG. 4C illustrates a first manway may be a lower manway LM connected to the first inlet header 102 (see FIG. 4B), and a second manway may be an upper manway UM connected to the first outlet header 106 (see FIG. 4B). The upper manway UM and an internal manway IM may access the passage between the first outlet header 106 and the second inlet header 112 (see FIG. 4B). The lower manway LM and internal manway IM may access in the second outlet header 116 (see FIG. 4B). Also, the PCCS condenser 100*b* may further include a lifting eye structure LE on an outer surface of the first and second header assemblies H1 and H2. The lifting eye structure LE may be near at least one of the first stage inlet header 102, the first stage outlet header 106, the second stage inlet header 112, and/or the second stage outlet header 116. The header assemblies H1 and H2, manways LM, IM, and UM may be formed of stainless steel such as SA 182 FXM-19 and the lifting eye structures LE may be formed of stainless steel such as SA240 XM-19.

Referring to FIGS. 4A to 4C, according to some example embodiments, a method of manufacturing the PCCS condenser 100*b* may include connecting the first stage condenser S1 to the second stage condenser S2, and providing the catalyst in at least the first outlet header 106 and/or second inlet header 112. The catalyst may be the catalyst coating 107 (see FIG. 3) and/or catalyst structure 108. The method may further include placing the catalyst in the second outlet header 116.

The connecting the first stage condenser S1 to the second stage condenser S2 may include connecting opposite ends of a plurality of channels into the tube openings TO defined by the first header assembly H1 and the second header assembly H2, respectively. The plurality of channels may include the first stage channels 104 and the second stage channels 114. The first stage channels 104 may provide a fluid flow path between the first stage inlet header 102 and the first stage outlet header 106. The second stage channels 114 may provide a fluid flow path between the second stage inlet header 112 and the second stage outlet header 116.

Figure 5A:
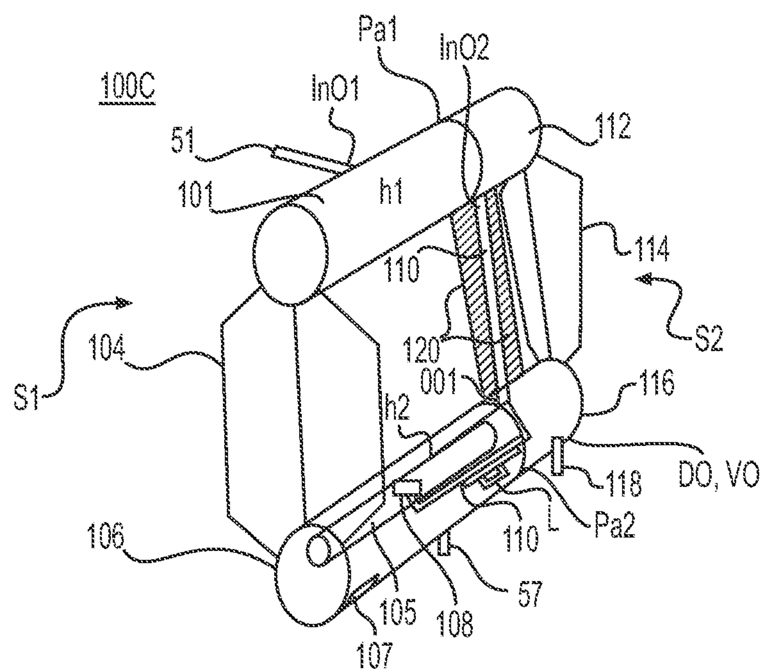
FIG. 5A is a perspective view of a multi-stage PCCS condenser according to some example embodiments.

FIG. 5A is a perspective view of a PCCS condenser according to some example embodiments.

Referring to FIG. 5A, a multi-stage PCCS condenser 100*c* according to some example embodiments may include a first stage condenser S1 spaced apart from a second stage condenser S2. The first stage condenser S1 may include a first stage inlet header 102, a first stage outlet header 106 defining a first outlet opening OO1, and first stage channels 104 in fluid communication between the first stage inlet header 102 and the first stage outlet header 106. The first stage inlet header 102 may include a first stage inlet opening InO1 for receiving the fluid mixture from the inlet conduit 51. The inlet conduit 51 may be connected to the first stage inlet opening InO1. The second stage condenser S2 may include a second stage inlet header 112, a second stage outlet header 116, and second stage channels 114 in fluid communication between the second stage inlet header 112 and the second stage outlet header 116. The second inlet stage header 112 may define a second inlet InO2 opening in fluid communication with the first stage outlet opening OO1 of the first stage outlet header 106 for receiving the fluid mixture (e.g., steam, $N_2$, $H_2$, and $O_2$) from the first stage outlet header 106. The first stage outlet header 106 and the second stage inlet header 112 may be in fluid communication via a cross-over conduit structure 110 (e.g., pipe). The cross-over conduit structure 110 may be surrounded by insulation 120 at a portion between the first stage outlet header 106 and the second stage inlet header 112. Respective ends of the cross-over conduit structure 110 may connect to the first outlet opening OO1 and the second inlet opening InO2.

The first stage condenser S1 and the second stage condenser S2 may be connected to each other. The first stage inlet header 102 and the second stage inlet header 112 may be connected to each other side-by-side and divided by a first partition Pa1. The first stage outlet header 106 and the second stage outlet header 116 may be connected to each other side-by-side and divided by a second partition Pa2. The first partition Pa1 may divide an internal volume of a housing assembly h1 into the first stage inlet header 102 and the second stage inlet header 112. The second partition Pa2 may divide an internal volume of a housing assembly h2 into first stage outlet header 106 and the second stage outlet header 116. The first and second housing assemblies h1 and h2 may be formed of stainless steel, such as SA182 FXM-19. The first partition Pa1 and the second partition Pa2 may be formed of stainless steel (e.g., SA312 Grade TP304L). Accordingly, the first stage condenser S1 and the second stage condenser S2 may be formed of stainless steel.

The PCCS condenser 100*c* may further include a catalyst 108 in at least one of the first stage outlet header 106 or a second stage inlet header 112. The second stage outlet header 116 may also include the catalyst 108 adjacent to the second outlet opening OO2 to reduce the likelihood of detonation from remaining amounts the second gas (e.g., $H_2$) and the third gas (e.g., $O_2$) entering the combined vent-and-drain conduit 118.

Instead of a separate catalyst 108 structure, or in addition to the catalyst 108 structure, a catalyst coating (see coating 107 in FIG. 3) may be coated on inner surfaces of the first stage outlet header 106 and/or second stage inlet header 112. The catalyst coating may include at least one of palladium (Pd), platinum (Pt), rhodium (Rh), alloys thereof, or a combination thereof, but is not limited thereto.

The first stage channels 104 may be configured to condense a first condensate portion (e.g., water liquid) from the first gas (e.g., steam) in the fluid mixture, based on heat exchange between the fluid mixture and an external environment (e.g., PCCS pool 20) through the first stage channels 104, as the fluid mixture flows through the first channels 104 from the first stage inlet header 102 to the first stage outlet header 106. The first stage channels 104 may be submerged in the PCCS pool 20 (see FIG. 1) and heat exchange with the PCCS pool 20 may condense some of the first gas from the fluid mixture flowing through the first stage channels 104.

The first stage outlet header 106 may separate the first condensate portion (e.g., condensed water) and the gases (e.g., steam, $N_2$, $H_2$ and $O_2$). The first condensate portion may flow through from the first stage outer header 106 to the GDCS pool 15 through the drain line 57 for use as reactor coolant without the second and third gases causing blocked or reverse flow. The second and third gases (e.g., $H_2$ and $O_2$), along with a remaining amount of the first gas (e.g., steam) and nitrogen, may flow through a cross-over conduit structure 110 surrounded by insulation 120 from the first stage outlet header 106 to the second stage inlet header 112.

The second stage condenser S2 may remove heat generated due to the catalytic reaction that forms the first gas (e.g., steam) from the second gas (e.g., $H_2$) and third gas ($O_2$). The second stage condenser S2 may remove the heat generated due the catalytic reaction by condensing a portion of the first gas formed by the catalytic reaction. Thus, the second stage condenser S2 may condense an additional amount of the first gas. In a general system without the second stage condenser S2, the additional amount of the first gas could flow through a vent line to the suppression pool 16 and increase the pressure of the containment. The second stage channels 114 may be being configured to condense a second condensate portion (e.g., water liquid) from the first gas (e.g., steam), based on heat exchange between the fluid mixture (e.g., steam, $H_2$, and $O_2$, etc.) and the external environment (e.g., PCCS pool 20) through the second stage channels 114, as the fluid mixture flows through the second stage channels 114 from the second stage inlet header 112 to the second stage outlet header 116.

The second stage outlet header 116 may define a second outlet opening DO for providing the second condensate portion (e.g., liquid water) to a drain line 57. The second outlet header 116 may define a vent opening VO for transmitting a portion (e.g., remaining steam and $H_2$ and $O_2$) of the fluid mixture to a vent line 58. The second stage channels 114 may be pipes. The second stage channels 114 may be formed of stainless steel, such as SA312 TPXM-19, but example embodiments are not limited thereto. The drain opening DO defined by the second stage outlet header 116 may surround the second outlet opening OO2 (or vent opening) defined by the second stage outlet header 116.

The second stage lower header 116 may include a drain collection manifold that separates the condensate portion (e.g., condensed water) and the second and third gases (e.g., $H_2$ and $O_2$) into the outer and inner passages, respectively, of the vent-and-drain conduit 118. In this way, the condensate portion may flow back into GDCS pool 15 for use as reactor coolant without the second and third gases causing blocked or reverse flow. The vent line 58 (see FIG. 1) and the drain line 57 may diverge from a vent-and-drain conduit 118. The vent-and-drain-conduit 118 may be in fluid communication with the drain opening DO and second outlet opening (or vent opening) defined by the second stage outlet header 116. A combined vent-and-drain conduit 118 may form a sealed connection to the second stage outlet header 116 at the drain opening DO and the second outlet opening. From the second stage outlet header 116, noncondensable gasses (e.g., $N_2$, $H_2$ and $O_2$) flow through the inner passage of the vent-and-drain conduit 118 through the second outlet opening OO2 into the vent line 58, and the second condensate portion (e.g., liquid water) may flow downward through drain opening DO and the outer passage of the vent-and-drain conduit 118 into the drain line 57 towards the GDCS pool 15 (see FIG. 1).

In the multi-stage PCCS condenser 100*c*, the first stage inlet header 102 may be an upper header above the first stage outlet header 106, and the first stage outlet header 106 may be a lower header. The second stage inlet header 112 may be an upper header above the second stage outlet header 116, and the second stage outlet header 116 may be a lower header. The inlet and outlet headers 102, 106, 112, and 116 may be formed of stainless steel, such as SA-182 FXM-19, but example embodiments are not limited thereto.

The PCCS condenser 100*c* may further include the catalyst 108 in the second outlet header 116 for catalyzing a reaction for forming the first gas (e.g., steam) from the second gas (e.g., $H_2$) and the third gas (e.g., $O_2$). The material of the catalyst 108 in the first stage outlet header 106 or the second stage inlet header 112 may be the same type of material or different than the catalyst 108 in the second stage outlet header 116.

The cross-over conduit structure 110 may be extend through the first outlet opening OO1 of the first stage outlet header 106 and may be connected to the second stage inlet opening InO2 of the second stage inlet header 112. The cross-over conduit structure 110 may provide a flow path for the fluid mixture (e.g., steam, $N_2$, $H_2$, $O_2$) between the first stage outlet header 106 and the second stage inlet header 112. The first stage outlet header 106 and the second stage inlet header 112 may be in fluid communication via a cross-over conduit 110 (e.g., pipe) surrounded by insulation 120.

The first stage outlet header 106 may include a drain collection manifold 105 for supplying the first condensate portion (e.g., liquid water condensed from steam) to the drain line 57 through the first stage outlet header 106. The drain collection manifold 105 may be positioned inside the first stage outlet header 106. An example of the drain collection manifold 105 is described in FIG. 5B.

Figure 5B:
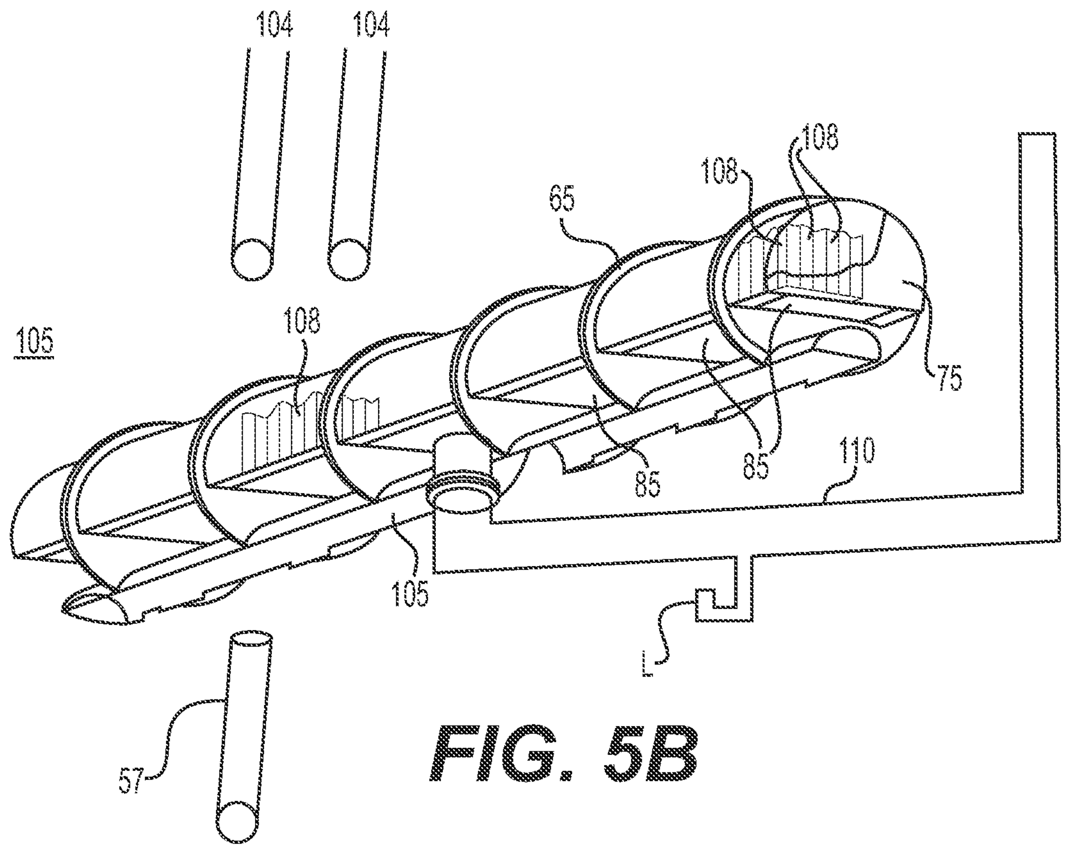
FIG. 5B is a perspective view of a catalyst assembly and drain collection manifold in a multi-stage PCCS condenser according to some example embodiments.

Referring to FIG. 5B, the drain collection manifold 105 may be used for collecting a first condensate portion (e.g., liquid water) from the fluid mixture and diverting the remaining fluid mixture (e.g., steam, $H_2$, $O_2$) to the cross-over conduit structure 110. Several compression wave baffles 65 brace and secure the drain collection manifold 105 in the first stage outlet header 106. The drain collection manifold 105 and compression wave baffles 65 may be formed of stainless steel, such as SA312 Grade TP304L. The drain collection manifold 105 may further include a drain screen 85 formed of stainless steel. The drain collection manifold 105 may be connected to the cross-over conduit structure 110 and in fluid communication therewith. The cross-over conduit structure 110 may extend through the first outlet opening OO1 to second stage inlet header 112. The catalyst 108 may be provided inside the drain collection manifold 105, and/or catalyst material 107 (see FIG. 3) may be coated on inner surfaces of the drain collection manifold 105, to catalyze a reaction that converts the second gas (e.g., $H_2$) and third gas (e.g., $O_2$) into the first gas (e.g., steam).

Condensate (e.g., liquid water) and the fluid mixture (e.g., steam, $H^2$, $O^2$) from the first stage channels 104 may flow from the first stage inlet header 102 into the first stage outlet header 106. The condensate (e.g., liquid water) may flow from the first stage channels 104 around the drip hood 75 and collect into the drain line 57. The first condensate portion (e.g., liquid water) may be collected through the drain line 57 and transported from the first stage outlet header 106 to the GDCS pool 15 (see FIG. 1). A remaining portion of the fluid mixture (e.g., steam, $H_2$, $O_2$) may flow through sides of the manifold 105 into inner passages of the manifold 105 below the drain hood 75 and over the catalyst 108. The catalyst 108 may catalyze a reaction that forms the first gas (e.g., steam) from the second and third gases (e.g., $H_2$ and $O_2$). The fluid mixture may flow out of the manifold 105 into the cross-over conduit structure 110. Some of the fluid mixture that condenses in the manifold 105 may be collected through the drain line 57 and transported from the first stage outlet header 106 to the GDCS pool 15. The drip hood 75 may be formed of stainless steel.

Although not illustrated, a manifold similar to the manifold 105 in FIG. 5B may be positioned in the second stage outlet header 116, except the manifold in the second stage outlet header 116 may have a combined vent-and-drain conduit connected to a center of the manifold 105 instead of the cross-over conduit structure 110.

Referring to FIG. 5A, according to some example embodiments, a method of manufacturing the PCCS condenser 100*c* may include connecting the first stage condenser S1 to the second stage condenser S2, and providing the catalyst in at least the first stage outlet header 106 and/or second stage inlet header 112. The catalyst may be the catalyst coating 107 (see FIG. 3) and/or catalyst structure 108. The method may further include placing the catalyst in the second stage outlet header 116.

The housing connecting the first stage condenser S1 to the second stage condenser S2 may include connecting opposite ends of a plurality of channels into the tube openings defined by the first header assembly H1 and the second header assembly H2, respectively. The plurality of channels may include the first stage channels 104 and the second stage channels 114. The first stage channels 104 may provide a fluid flow path between the first stage inlet header 102 and the first stage outlet header 106. The second stage channels 114 may provide a fluid flow path between the second stage inlet header 112 and the second stage outlet header 116. The method may further include positioning the drain collection manifold 105 into the first stage outlet header 106 and connecting a first end of the cross-over conduit structure 110 to the drain collection manifold 105 through the first stage outlet opening. The method may further include connecting a second end of the cross-over conduit structure to the second stage inlet header 112 through the second stage inlet opening InO2.

Figure 6:
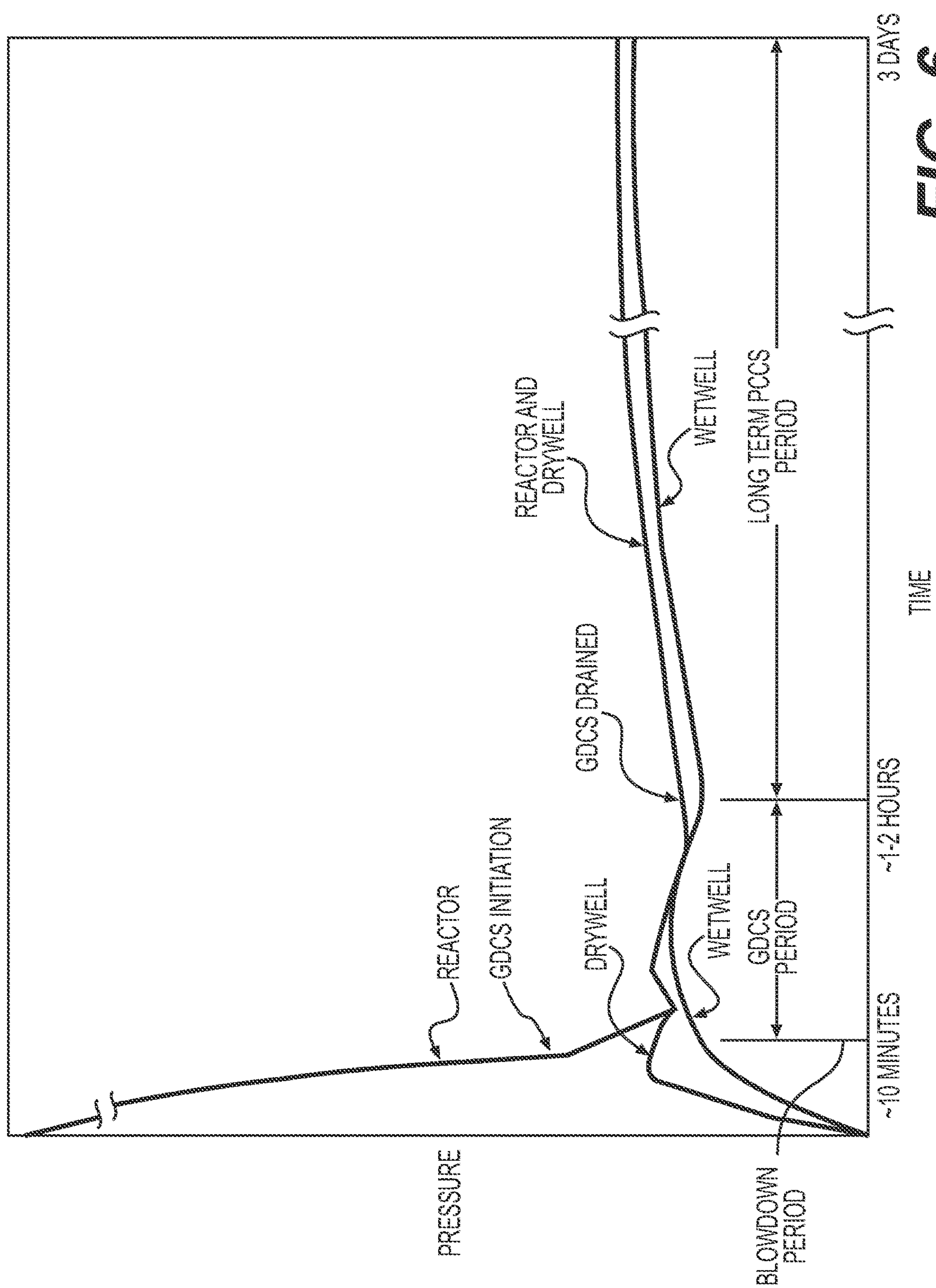
FIG. 6 is a prior art graph depicting pressure versus time showing the responsive pressure in containment following an accident and indicates the different modes of PCCS operation.

After a nuclear reactor shuts down, during a first two periods, the inlet flow through the PCCS will be have a lower fraction of radiolytic gas and a higher fraction steam or nitrogen. During the first and second periods, the Blowdown Period and the GDCS Period shown in FIG. 6, the catalyst will not produce much steam, and the condensation in the second stage condenser S2 will be relatively small. In the third period, the Long Term PCCS Period shown in FIG. 6, which may be about 1 to 2 hours after the first period, the fluid mixture flowing through the second stage condenser S2 may have a lower non-condensable gas fraction (e.g., $H_2$ and $O_2$) than the first stage condenser S1; thus, the second stage condenser S2 may condense an amount of the first gas (e.g., steam) that did not condense in the first stage condenser S1. Additionally, the second stage condenser S2 may remove heat generated from the catalytic reaction of forming the first gas (e.g., steam) from the second gas (e.g., $H_2$) and the third gas (e.g., $O_2$); thus, less heat from the catalytic reaction may be transferred to the suppression pool, such that the second stage condenser S2 limits and/or prevents the catalytic reaction from heating and pressurizing the containment.

In the PCCS condensers 100*a*, 100*b*, and 100*c* according to some example embodiments, the flow area of the first and the second stage condensers S1 and S2 may be sized differently. The first stage condenser S1 may be a larger size than the second stage condenser S2 to accommodate the steam inlet flow and pressures during the blowdown period or GDCS period shown in FIG. 6 and the early part of the PCCS period when decay heat and steam generation in the reactor is high. The second stage condenser S2 may be smaller than the first stage condenser S1.

Figure 7B:
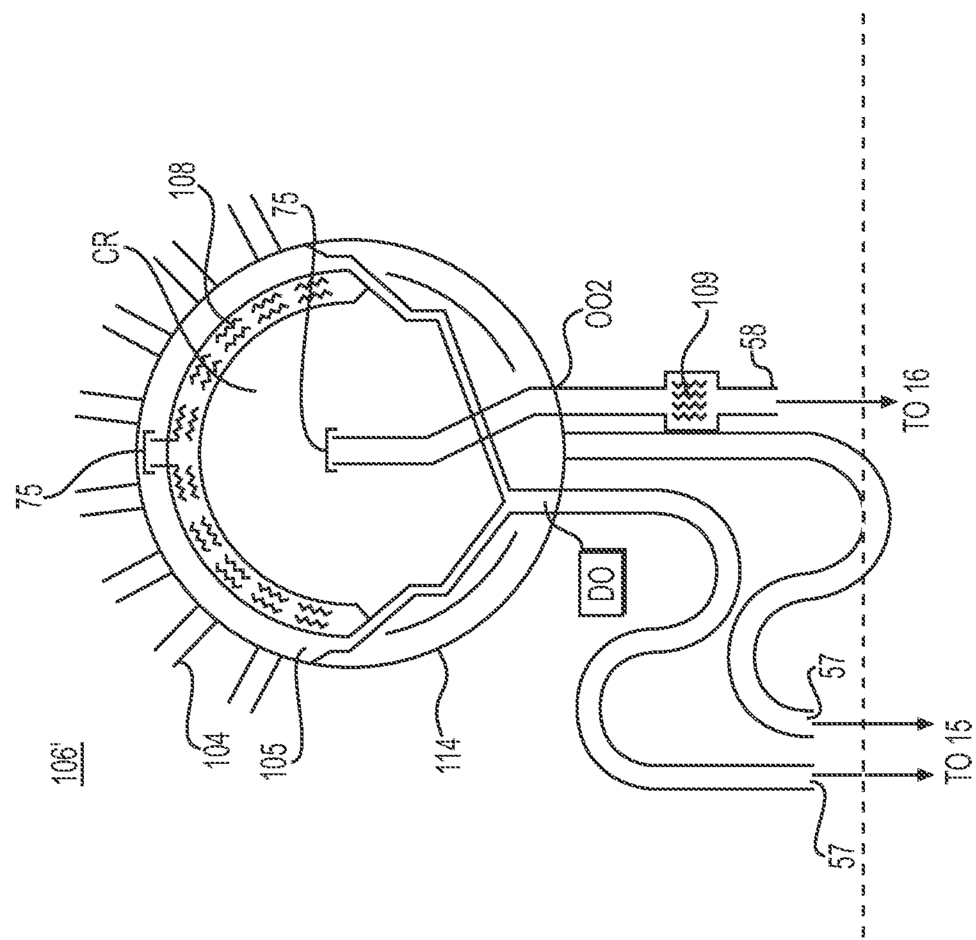
FIG. 7B is a sectional view of the lower header in FIG. 7A.
Figure 7A:
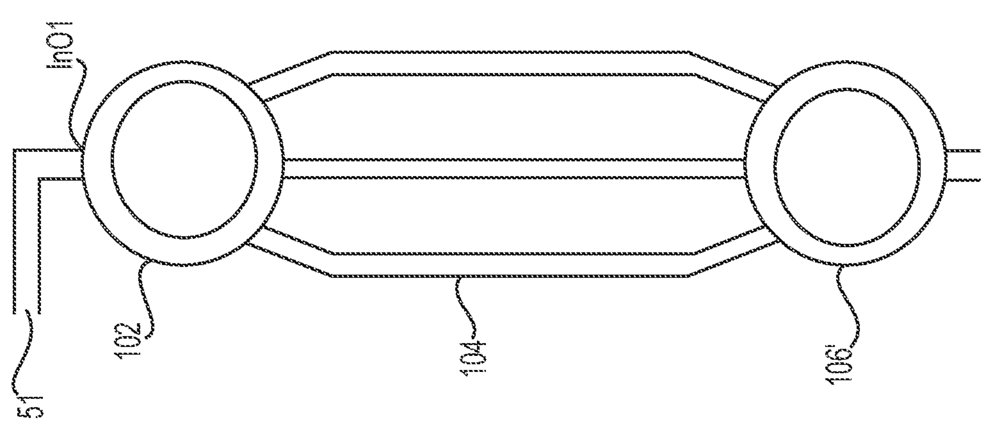
FIG. 7A is a sectional view of a multi-stage PCCS condenser according to some example embodiments where the second stage is internal to the lower header.

FIG. 7A is a sectional view of a multi-stage PCCS condenser according to some example embodiments where the second stage is internal to the lower header. FIG. 7B is a sectional view of the lower header in FIG. 7A.

Referring to FIG. 7A, a multi-stage PCCS condenser 100*d* according to some example embodiments may include a first inlet header 102 connected to channels 104 like the PCCS condenser 100*a* described in FIG. 2, but the first inlet header 102 of the PCCS condenser 100*d* may be connected to a modified lower header 106' through the first channels 104 instead. The first inlet conduit 51 may be connected to the first inlet header 102 for supplying a fluid mixture to the first inlet header 102 through the first inlet opening InO1.

The first channels 104 may be configured to condense a first condensate portion (e.g., water liquid) from a first gas (e.g., steam) in the fluid mixture, based on heat exchange between the fluid mixture and an external environment (e.g., PCCS pool 20 see FIG. 1) through the first channels 104, as the fluid mixture flows through the first channels 104 from the first inlet header 102 to the modified lower header 106'. The first channels 104 may be submerged in the PCCS pool 20, and heat exchange with the PCCS pool 20 may condense some of the first gas from the fluid mixture flowing through the first channels 104.

Referring to FIGS. 2, 7A, and 7B, the modified lower header 106' of FIGS. 7A and 7B combines the first outlet header 106, second inlet header 112, and second outlet header 116 of FIG. 2 into one structure. With the modified lower header 106' in FIGS. 7A and 7B, the cross-over conduit structure 110 of FIG. 2 may be eliminated and the second stage condenser S2 of FIG. 2 may be built into the interior of the modified lower header 106'.

Referring to FIG. 7B, the modified lower header 106' may include a first cavity portion operable as a drain collection manifold 105, one or more drip hoods 75, a first-stage catalyst 108, a second cavity portion including second channels 114, and a central region CR. The modified lower header 106' may be connected to a drain line 57 and a vent line 58. More catalyst 109 may be in the vent line 58.

The first cavity portion of the modified lower header structure 106' may be in a top region of the modified lower header 106' and may define the drain collection manifold 105, which may receive the fluid mixture from the first channels 104 connected to the first inlet header 102. A drain line 57 at the bottom of the first cavity portion may collect a first condensate portion (e.g., liquid water) from the drain collection manifold 105 and deliver the first condensate portion to the GCDS pool 15. A remaining portion of the fluid mixture (e.g., steam, $N_2$, $H_2$, $O_2$), which is not drained through the drain line 57 connected to the drain collection manifold 105, may flow below the drip hood 75 and over the catalyst 108 into the second channels 114. The catalyst 108 may catalyze a reaction that forms the first gas (e.g., steam) from the second and third gases (e.g., $H_2$, $O_2$).

The second cavity portion including the second channels 114 may be in a lower region of the modified lower header 106'. The second channels 114 may extend along an interior lower portion of the modified lower header 106'. Based on heat exchange between the fluid mixture and the external environment through the outer surface of the modified lower header 106' in the second channels 114, a second condensation portion (e.g., liquid water) may be condensed from the fluid mixture (e.g., steam, $H_2$, $O_2$). As the fluid mixture flows through the second channels 114, another drain line 57 in fluid communication with the second channels 114 at a bottom region of the modified lower header 106' may collect the second condensate portion (e.g., liquid water) from the fluid mixture exiting the second channels 114 and deliver the second condensate portion to the GCDS pool 15. The other drain line 57 may be connected to a drain opening DO defined by the modified lower header 106'.

The central region CR of the modified lower header 106' may be in a region downstream of the second channels 114. The central region CR may correspond to a collection point for non-condensable gas. As a remaining portion of the fluid mixture (e.g., a gaseous portion of the fluid mixture) exits the second channels 114, the remaining portion may be collected under a drip hood 75 in the central region CR and directed to a vent line, 58. The vent line 58 may be connected to the modified lower header 106' and may be in fluid communication with the central region through an outlet opening OO2. The vent line, 58 optionally may include a vent catalyst, 109 in the fluid flow path of the vent line. The vent line may collect the remaining portion of the fluid mixture from the central region CR and direct the remaining portion of the fluid mixture to the suppression pool 16. The modified lower header 106' may provide a more compact embodiment that takes advantage of the heat transfer surface of modified lower header structure.

While a number of example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims.

The invention claimed is:

1. A passive containment cooling system (PCCS) for a nuclear reactor, the PCCS comprising:
a first stage condenser including a first inlet header, a first outlet header defining a first outlet opening, and first channels in fluid communication between the first inlet header and the first outlet header,
the first inlet header defining a first inlet opening for receiving a fluid mixture,
the first channels being configured to condense a first condensate portion from a first gas in the fluid mixture, based on heat exchange between the fluid mixture and an external environment through the first channels, as the fluid mixture flows through the first channels from the first inlet header to the first outlet header;
a catalyst in at least one of the first outlet header or a second inlet header of a second stage condenser, the catalyst being configured to catalyze a reaction for forming the first gas from a second gas and a third gas in the fluid mixture as the fluid mixture flows through at least one of the first outlet header or the second inlet header; and
the second stage condenser,
the second stage condenser including the second inlet header, a second outlet header, and second channels in fluid communication between the second inlet header and the second outlet header,
the second inlet header defining a second inlet opening in fluid communication with the first outlet opening for receiving the fluid mixture from the first outlet header,
the second channels being configured to condense a second condensate portion from the first gas, based on heat exchange between the fluid mixture and the external environment through the second channels, as the fluid mixture flows through the second channels from the second inlet header to the second outlet header,
the second outlet header defining a second outlet opening for providing the second condensate portion to a drain line, and
the second outlet header defining a vent opening for transmitting a portion of the fluid mixture to a vent line.

2. The PCCS of claim 1, wherein at least one of
a heat-transfer area corresponding to the first channels is greater than a heat-transfer area corresponding to the second channels, or
an overall size of the first stage condenser is greater than an overall size of the second stage condenser.

3. The PCCS of claim 1, further comprising at least one of:
an inlet conduit connected to the first inlet opening;
the drain line connected to the second outlet opening; and
the vent line connected to the vent opening of the second outlet header.

4. The PCCS of claim 1, wherein the first stage condenser and the second stage condenser are spaced apart from each other.

5. The PCCS of claim 1, further comprising:
a cross-over conduit structure connected to the first outlet opening of the first outlet header and the second inlet opening of the second inlet header, wherein
the cross-over conduit structure is configured to provide a flow path for the fluid mixture between the first outlet header and the second inlet header.

6. The PCCS of claim 5, wherein
the first stage condenser and the second stage condenser are connected to each other,
the first inlet header and the second inlet header are connected to each other side-by-side,
the first outlet header and the second outlet header are connected to each other side-by-side, and
the cross-over conduit structure includes a pipe and an insulation material surrounding the pipe.

7. The PCCS of claim 1, wherein
the first stage condenser and the second stage condenser are connected to each other,
the first inlet header and the second outlet header are connected side-by-side and divided by a first partition,
the first partition defining a drain path with a loop seal for supplying the first condensate portion to the second outlet opening,
the first outlet header and the second inlet header are connected to each other side-by-side and divided by a second partition, and
opposite sides of the second partition define the first outlet opening and the second inlet opening such that the first outlet opening and the second inlet opening are in fluid communication through the second partition.

8. The PCCS of claim 7, further comprising at least one of:
a first manway connected to the first inlet header,
a second manway connected to the first outlet header, or
a second catalyst in the second outlet header.

9. The PCCS of claim 7, further comprising:
a lifting eye structure on at least one of the first inlet header, the first outlet header, the second inlet header, or the second outlet header.

10. The PCCS of claim 7, further comprising:
a combined vent-and-drain pipe attached to the second outlet header, wherein
the vent opening of the second outlet header is surrounded by the second outlet opening of the second outlet header,
the combined vent-and-drain pipe includes a drain portion in fluid communication with the second outlet opening for supplying the first condensate portion and the second condensate portion to the drain line, and
the combined vent-and-drain pipe includes a vent portion that is surrounded by the drain portion and is in fluid communication with the vent opening for transmitting the portion of the fluid mixture to the vent line.

11. The PCCS of claim 1, wherein
the first stage condenser and the second stage condenser are connected to each other,
the first inlet header and the second outlet header are connected side-by-side and divided by a first partition,
the first partition includes a drain opening allowing for allowing condensate to drain from the first inlet header into the second outlet header,
the first outlet header and the second inlet header are connected to each other side-by-side and divided by a second partition, and
opposite sides of the second partition define the first outlet opening and the second inlet opening such that the first outlet opening and the second inlet opening are in fluid communication through the second partition.

12. The PCCS of claim 1, further comprising:

a lifting eye structure on the first stage condenser.

13. A passive containment cooling system (PCCS) for a nuclear reactor, the PCCS comprising:

a first stage condenser including a first inlet header, a first outlet header defining a first outlet opening, and first channels in fluid communication between the first inlet header and the first outlet header, the first inlet header defining a first inlet opening;

a catalyst in at least one of the first outlet header or a second inlet header of a second stage condenser, the catalyst including at least one of palladium (Pd), Platinum (Pt), rhodium (Rh), an alloy thereof, or a combination thereof; and the second stage condenser, the second stage condenser including the second inlet header, a second outlet header, and second channels in fluid communication between the second inlet header and the second outlet header, the second inlet header defining a second inlet opening in fluid communication with the first outlet opening, the second outlet header defining a second outlet opening for providing condensate to a drain line, and the second outlet header defining a vent opening in fluid communication with a vent line.

14. The PCCS of claim 1, wherein the first inlet header and the first outlet header are spaced apart from each other, and the first channels extend from the first inlet header to the second outlet header through an area between the first inlet header and the second outlet header.

15. The PCCS of claim 1, wherein the second inlet header and the second outlet header are spaced apart from each other, and the second channels extend from the second inlet header to the second outlet header through an area between the second inlet header and the second outlet header.

* * * * *